(12) United States Patent
Drescher et al.

(10) Patent No.: US 10,078,140 B2
(45) Date of Patent: Sep. 18, 2018

(54) NAVIGATION SATELLITE SYSTEM POSITIONING INVOLVING THE GENERATION OF ADVANCED CORRECTION INFORMATION

(71) Applicant: Trimble Inc., Sunnyvale, CA (US)

(72) Inventors: Ralf Drescher, Höhenkirchen-Siegertsbrunn (DE); Xiaoming Chen, Höhenkirchen-Siegertsbrunn (DE)

(73) Assignee: Trimble Inc., Sunnyvale, CA (US)

( * ) Notice: Subject to any disclaimer, the term of this patent is extended or adjusted under 35 U.S.C. 154(b) by 271 days.

(21) Appl. No.: 15/047,419

(22) Filed: Feb. 18, 2016

(65) Prior Publication Data

US 2017/0045624 A1 Feb. 16, 2017

(30) Foreign Application Priority Data

Aug. 14, 2015 (EP) ................................. 15181094

(51) Int. Cl.
*G01S 19/44* (2010.01)
*G01S 19/07* (2010.01)

(52) U.S. Cl.
CPC .............. *G01S 19/44* (2013.01); *G01S 19/07* (2013.01)

(58) Field of Classification Search
CPC ...... G01S 19/44; G01S 13/04; G01S 13/0209; G01S 13/56

(Continued)

(56) References Cited

U.S. PATENT DOCUMENTS

2007/0258485 A1 11/2007 Kappi
2012/0127028 A1* 5/2012 Bamler ................ G01C 11/00
342/25 C (Continued)

FOREIGN PATENT DOCUMENTS

EP 2 746 811 A2 6/2014
EP 3 035 080 A1 6/2016

(Continued)

OTHER PUBLICATIONS

Joosten, P. et al., "Fixing the Ambiguities—Are You Sure They're Right?" GPS World, 11(5), May 2000, 6 pages.

(Continued)

*Primary Examiner* — Harry K Liu
(74) *Attorney, Agent, or Firm* — Kilpatrick Townsend & Stockton LLP

(57) ABSTRACT

The invention relates to generating regional tropospheric correction information for correcting observations useful for estimating phase ambiguities and/or a position of global or regional navigation satellite systems (NSS) receiver(s). For each of a plurality of reference stations, at least one troposphere correction parameter is estimated by evaluating NSS observation equations using i) precise satellite information or the information derived from the precise satellite information, and ii) received multiple-frequency-signals-based raw observations or a linear combination thereof. The regional tropospheric correction information is then generated based on the estimated troposphere correction parameter(s) per reference station, the tropospheric correction information comprising a regional tropospheric delay function(s) and coefficients representing a tropospheric delay affecting a NSS signal passing through the troposphere in a region of interest. The generated tropospheric correction information may then be sent to NSS receiver(s) and used by the receiver(s) for example to facilitate position determination.

16 Claims, 8 Drawing Sheets

(58) Field of Classification Search
USPC .................................................. 342/357.27
See application file for complete search history.

(56) References Cited

U.S. PATENT DOCUMENTS

2013/0044026 A1   2/2013  Chen et al.
2015/0293233 A1*  10/2015 De Jong ................ G01S 19/04
                                                   342/357.27

FOREIGN PATENT DOCUMENTS

| WO | 2010/021660 A2 | 2/2010 |
| WO | 2011/034614 A2 | 3/2011 |
| WO | 2011/034616 A2 | 3/2011 |
| WO | 2011/100680 A2 | 8/2011 |
| WO | 2011/100690 A2 | 8/2011 |
| WO | 2011/126605 A2 | 10/2011 |

OTHER PUBLICATIONS

Gao, Y. et al., "Precise Point Positioning and Its Challenges," Inside GNSS, 1(8), (2006), 5 pages.
Dach, R., et al., "User Manual of the Bernese GPS Software Version 5.0," Astronomical Institute, University of Bern, Jan. 2007, retrieved in Jul. 2015 from http://www.bernese.unibe.ch/docs50/DOCU50.pdf, 640 pages.
Landau, H. et al., "Virtual Reference Station Systems," Journal of Global Positioning Systems, (2002), vol. 1, No. 2: pp. 137-143.
Brown, N. et al., "RTK Rover Performance using the Master-Auxiliary Concept," Journal of Global Positioning Systems, (2006), vol. 5, No. 1-2: pp. 135-144.
Vollath, U. et al., "Troposphere: Signal or Noise?," Proceedings of the 16th International Technical Meeting of the Satellite Division of the Institute of Navigation, (ION GPS/GNSS 2003).
Niell, A.E., "Global mapping functions for the atmosphere delay at radio wavelengths," Journal of Geophysical Research (1996), 101(B2), 2. pp. 3227-3246.
Boehm, J. et al., "Short Note: A global model of pressure and temperature for geodetic applications," Journal of Geodesy, (2007).
Böhm, J. et al., "Development of an improved blind model for slant delays in the troposphere (GPT2w)," GPS Solutions, 2014, pp. 433-441.
De Santis, A. et al., "Regional Geomagnetic Field Modelling: the contribution of the Istituto Nazionale di Geofisica," Annali di Geofisica, vol. XL, 5, (1997), 1161-1169.
Takeichi, N. et al. "Tropospheric delay correction with dense GPS network in L1-SAIF augmentation", GPS Solutions, Springer, (2010), vol. 14, No. 2, pp. 185-192.
Rippl, M. et al.: "ARAIM Operational Performance Tested in Flight", ITM 2014—Proceedings of the 2014 International Technical Meeting of the Institute of Navigation, Jan. 27-29, 2014, pp. 601-615.
Chen, X. et al., "Trimble RTX, an Innovative New Approach for Network RTK," ION GNSS, (2011), Whitepaper, 6 pages.
Teunissen, P. "The least-squares ambiguity decorrelation adjustment: A method for fast GPS integer ambiguity estimation," Journal of Geodesy, 70(1-2), 65-82, (1995).
Brandl, M., "Improvements of Position Convergence and Availability with an Augmented Trimble CenterPoint RTX Service," ION GNSS+ Conference, Sep. 2015, Abstract only.
Extended European Search Report for Application No. EP 15181094.2-1812, 11 pages.

* cited by examiner

NAVIGATION SATELLITE SYSTEM POSITIONING INVOLVING THE GENERATION OF ADVANCED CORRECTION INFORMATION

RELATED APPLICATIONS

This application claims priority to European Patent Application No. EP15181094.2, filed on Aug. 14, 2015, the entire contents of which are incorporated by reference herein for all purposes.

FIELD OF TECHNOLOGY

The invention relates to global or regional navigation satellite systems (NSS) position estimation methods, devices and computer programs. The fields of application of the methods, devices and computer programs include, but are not limited to, navigation, map-making, land surveying, civil engineering, agriculture, disaster prevention and relief, and scientific research.

BACKGROUND

Navigation satellite systems (NSS) include both global navigation satellite systems (GNSS) and regional navigation satellite systems (RNSS), such as the Global Positioning System (GPS) (United States), GLONASS (Russia), Galileo (Europe), BeiDou (China), QZSS (Japan), and the Indian Regional Navigational Satellite System (IRNSS) (systems in use or in development). A NSS typically uses a plurality of satellites orbiting the Earth. The plurality of satellites forms a constellation of satellites. A NSS receiver detects a code modulated on an electromagnetic signal broadcast by a satellite. The code is also called a ranging code. Code detection includes comparing the bit sequence modulated on the broadcasted signal with a receiver-side version of the code to be detected. Based on the detection of the time of arrival of the code for each of a series of the satellites, the NSS receiver estimates its position. Positioning includes, but is not limited to, geolocation, i.e. the positioning on the surface of the Earth.

An overview of GPS, GLONASS and Galileo is provided for instance in sections 9, 10 and 11 of Hofmann-Wellenhof B., et al., *GNSS, Global Navigation Satellite Systems, GPS, GLONASS, Galileo, & more*, Springer-Verlag Wien, 2008, (hereinafter referred to as "reference [1]").

Positioning using NSS signal codes provides a limited accuracy, notably due to the distortion the code is subject to upon transmission through the atmosphere. For instance, the GPS includes the transmission of a coarse/acquisition (C/A) code at about 1575 MHz, the so-called L1 frequency. This code is freely available to the public, whereas the Precise (P) code is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors and multipath propagation.

An alternative to positioning based on the detection of a code is positioning based on carrier phase measurements. In this alternative approach or additional approach (ranging codes and carrier phases can be used together for positioning), the carrier phase of the NSS signal transmitted from the NSS satellite is detected, not (or not only) the code modulated on the signal transmitted from the satellite.

The approach based on carrier phase measurements has the potential to provide much greater position precision, i.e. down to centimeter-level or even millimeter-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the number of cycles cannot be directly determined in an unambiguous manner. This is the so-called "integer ambiguity problem", "integer ambiguity resolution problem" or "phase ambiguity resolution problem", which may be solved to yield the so-called fixed solution.

GNSS observation equations for code observations and for carrier phase observations are for instance provided in reference [1], section 5. An introduction to the GNSS integer ambiguity resolution problem, and its conventional solutions, is provided in reference [1], section 7.2. The skilled person will recognize that the same or similar principles apply to RNSS systems.

The main GNSS observables are therefore the carrier phase and code (pseudorange), the former being much more precise than the latter, but ambiguous. These observables basically enable a user to obtain the geometric distance from the receiver to the satellite. With known satellite position and satellite clock error, the receiver position can be estimated.

As mentioned above, the GPS includes the transmission of a C/A code at about 1575 MHz, the so-called L1 frequency. More precisely, each GPS satellite transmits continuously using two radio frequencies in the L-band, referred to as L1 and L2, at respective frequencies of 1575.42 MHz and 1227.60 MHz. With the ongoing modernization of the GPS, signals on a third frequency will be available. Among the two signals transmitted on L1, one is for civil users and the other is for users authorized by the United States Department of Defense (DoD). Signals are also transmitted on L2, for civil users and DoD-authorized users. Each GPS signal at the L1 and L2 frequency is modulated with a pseudo-random number (PRN) code, and with satellite navigation data. Two different PRN codes are transmitted by each satellite: a C/A code and a P code which is encrypted for DoD-authorized users. Each C/A code is a unique sequence of 1023 bits, which is repeated each millisecond. Other NSS systems also have satellites transmitting multiple signals on multiple carrier frequencies.

FIG. 1 schematically illustrates a prior art NSS system 100. Receiver 110 receives NSS signals from any number of satellites in view, such as at 120, 130 and 140. The signals pass through the Earth's ionosphere 150 and through the Earth's troposphere 160. Each signal has multiple carrier frequencies, such as frequencies L1 and L2. Receiver 110 determines from the signals respective pseudo-ranges PR1, PR2, . . . , PRm, to the satellites. Pseudo-range determinations are distorted by signal-path variations resulting from passage of the signals through the ionosphere 150 and the troposphere 160, and from multipath effects, as indicated schematically at 170. Pseudo-ranges can be determined using the C/A code with an error of about one meter. However, the phases of the L1 and L2 carriers can be measured with an accuracy of 0.01 to 0.05 cycles (corresponding to an error of 2 mm to 1 cm). GNSS signals are influenced by the dispersive effects of the ionosphere, which vary over time.

The processing of the phase observations leads to a much higher accuracy, which can be advantageously used for precise NSS positioning. The phase observations are ambiguous by the ambiguity term which is a product of an unknown integer number and the wavelength of the carrier signal. These unknowns could be handled by simply being estimated as float numbers within the GNSS parameter estimation. The corresponding position result is a so-called float solution. Another possibility is to fix them to their integer values by corresponding methods and introduce them in the GNSS parameter estimation. By doing so, the number of unknowns is reduced drastically, and the accuracy of the positioning result, i.e. the fixed solution, is better than the float solution (as explained for example in: Joosten and Tiberius (2000): *Fixing the ambiguities—are you sure they are right?*, GPS world, 11(5), pp. 46-51).

Artificial observations can also be computed from the original ones by forming linear combinations. This is true both for the code and phase observations. These linear combinations have different properties compared to the original observations. Popular linear combinations include: the Melbourne-Wuebbena (MW) linear combination, the widelane linear combination, the geometric-free linear combination (also called ionospheric linear combination) and the ionospheric-free linear combination (also called geometric linear combination). Some combinations have properties that are specifically beneficial for some dedicated applications (as explained for example in: WO 2011/034616 A2, hereinafter referred to as "reference [2]").

Relative positioning allows common-mode errors to be mitigated by differencing the observations of the rover station with observations of a reference station at a known location near the rover station, e.g. within 2 to 10 km. By using the network-based Real Time Kinematic (RTK) techniques, the distance between the rover and the closest reference station can be increased up to 50 km.

Precise point positioning (PPP), also called absolute positioning, uses a single GNSS receiver together with precise satellite orbit and clock data to reduce satellite-related error sources. A dual-frequency receiver can remove the first-order effect of the ionosphere by using the ionospheric-free linear combination. Afterwards, position solutions are accurate in a range of centimeters to decimeters. The utility of PPP is limited by the need to wait longer than desired for the float position solution to converge to centimeter accuracy (e.g., an accuracy below 4 cm). This waiting time is called convergence time. In contrast to relative positioning techniques in which common-mode errors are reduced by differencing of observations, PPP processing uses undifferenced carrier-phase observations so that the ambiguity terms are corrupted by satellite and receiver phase biases unless the effects are modelled. Methods have been proposed for integer ambiguity resolution in PPP processing. See for example reference [2], and Y. Gao et al. (2006): *Precise Point Positioning and Its Challenges*, Inside GNSS, 1(8), pp. 16-18.

Embodiments described in WO 2011/034614 A2 (hereinafter referred to as "reference [3]") generate synthetic base station data preserving the integer nature of carrier phase data. A set of corrections is computed per satellite (a MW-bias, a code leveled clock error and a phase leveled clock error) from global network data. Using these corrections, a rover station can use the MW-combination to determine widelane ambiguities and use ionospheric-free phase observations to determine the N1 (narrowlane) ambiguities. With the determined ambiguities, the rover station can achieve centimeter-level accuracy positioning in real-time. The advantage of this approach is that it is insensitive to ionospheric activity; the disadvantage is that the convergence time is longer than desired.

In order to improve the convergence time, US 2013/0044026 A1 (hereinafter referred to as "reference [4]") describes a method making use of an ionosphere model and further deriving an ionospheric-phase bias per satellite in addition to other corrections (a MW-bias, a code-leveled clock error and a phase-leveled clock error) to generate synthetic base station data. The synthetic base station data generated with this approach preserves the integer nature of carrier phase data, and it can be used for both single and dual frequency rover stations. This approach requires an ionosphere model. The convergence time can be further reduced if an improved ionosphere model based on a regional network of reference stations is used. In that respect, see co-pending European patent application 14 198 216.5, entitled "Navigation satellite system positioning involving the generation of correction information", filed on 16 Dec. 2014 in the name of Trimble Navigation Limited (hereinafter referred to as "reference [5]").

There is a constant need for improving the implementation of positioning systems based notably on GNSS (or RNSS) measurements, to obtain a precise estimation of the receiver position, and in particular to quickly obtain a precise estimation, so as to increase the productivity of positioning systems.

SUMMARY

The present invention aims at addressing the above-mentioned need. The invention includes methods, apparatuses, computer programs, computer program products and storage mediums as defined in the independent claims. Particular embodiments are defined in the dependent claims.

In one embodiment, a method is carried out by a computer or set of computers in order to generate correction information, hereinafter referred to as "tropospheric correction information". The tropospheric correction information comprises information for correcting observations useful for estimating phase ambiguities and/or a position of at least one global or regional navigation satellite system (NSS) receiver. The NSS receiver(s) is located within the troposphere and on or above a region of interest of the Earth's surface. The method comprises the following steps. For each of a plurality of reference stations in the region of interest, raw observations, hereinafter referred to as "multiple-frequency-signals-based raw observations", obtained by the reference station observing NSS multiple-frequency signals from a plurality of NSS satellites over multiple epochs, are received. Precise satellite information is also obtained on a) the orbit position of each one of the NSS satellites, and b) a clock offset of each one of the NSS satellites; or information derived from the precise satellite information is obtained. For each of the reference stations, at least one troposphere correction parameter is estimated by evaluating NSS observation equations using i) the precise satellite information or the information derived from the precise satellite information, and ii) the received multiple-frequency-signals-based raw observations or a linear combination of the received multiple-frequency-signals-based raw observations. The tropospheric correction information is generated, based on the estimated at least one troposphere correction parameter per reference station, wherein the tropospheric correction information comprises 1) at least one mathematical function, each of which being hereinafter referred to as "regional tropospheric delay function", and 2) its coefficients, hereinafter referred to as "regional tropospheric delay coefficients", wherein the at least one regional tropospheric delay function and its regional tropospheric delay coefficients represent a delay, hereinafter referred to as "tropospheric delay", affecting a NSS signal passing through the troposphere in the region of interest. The generated tropospheric correction information may then be sent, for example to facilitate position determination, to the NSS receiver(s) and/or to one or more servers in charge of processing raw observations obtained by the NSS receiver(s).

The method enables the provision, to NSS receivers and/or to servers in charge of processing observations from NSS receiver(s), of regionally-applicable tropospheric correction information (i.e., regional tropospheric correction information) for use for example by PPP applications, to reduce the convergence time of the positioning solution. The regional correction information represents regional troposphere correction models. The method enables the estimation of such regional troposphere correction models.

The invention also relates, in one embodiment, to a method carried out by an apparatus, which may be a global or regional NSS receiver or a server in charge of processing observations from NSS receiver(s). The apparatus receives correction information, i.e. "tropospheric correction information". The tropospheric correction information comprises 1) at least one mathematical function, each of which being here referred to as "regional tropospheric delay function", and 2) its coefficients, here referred to as "regional tropospheric delay coefficients". The at least one regional tropospheric delay function and its regional tropospheric delay coefficients represent a delay, hereinafter referred to as "tropospheric delay", affecting a NSS signal passing through the troposphere in a region of interest of the Earth's surface. The apparatus also observes NSS multiple-frequency signals from the plurality of NSS satellites over multiple epochs, or obtains such observed signals; and the apparatus performs at least one of: estimating ambiguities in the carrier phase of the observed signals using the received tropospheric correction information, and estimating the position of the NSS receiver using the observed signals and the received tropospheric correction information.

The invention also relates, in one embodiment, to an apparatus for generating tropospheric correction information, in the manner described above. The invention also relates, in one embodiment, to the tropospheric correction information itself.

The invention also relates, in one embodiment, to an apparatus configured for receiving and making use of the tropospheric correction information, in the manner described above.

The invention also relates, in some embodiments, to computer programs, computer program products, and storage mediums for storing such computer programs, comprising computer-executable instructions for carrying out, when executed on a computer such as one embedded in a NSS receiver or in another apparatus, any one of the above-mentioned methods.

BRIEF DESCRIPTION OF THE DRAWINGS

Embodiments of the present invention shall now be described, in conjunction with the appended drawings in which.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

Throughout the following detailed description, the abbreviation "GNSS" is used. The invention is, however, not limited to global navigation satellite systems (GNSS) but also applies to regional navigation satellite systems (RNSS). Thus, it is to be understood that each occurrence of "GNSS" in the following can be replaced by "RNSS" to form additional embodiments.

When the term "real-time" is used in the present document, it means that there an action (e.g., data is processed, results are computed) as soon as the required information for that action is available. Thus, certain latency exists, which depends on various aspects depending on the involved component(s) of the system.

When the term "troposphere" is used in the present document, in particular, but not only, when discussing the effects the troposphere has on a NSS signal in terms of the delay affecting the NSS signal, this is meant to also include any effect of the other constituents of the non-ionized atmosphere, i.e. of the neutral atmosphere, such as effects of the stratosphere. For conciseness, and because the effects of the troposphere are dominant, it is therefore referred to the effects of the troposphere to mean both the effects of the troposphere and the stratosphere.

Figure 1:
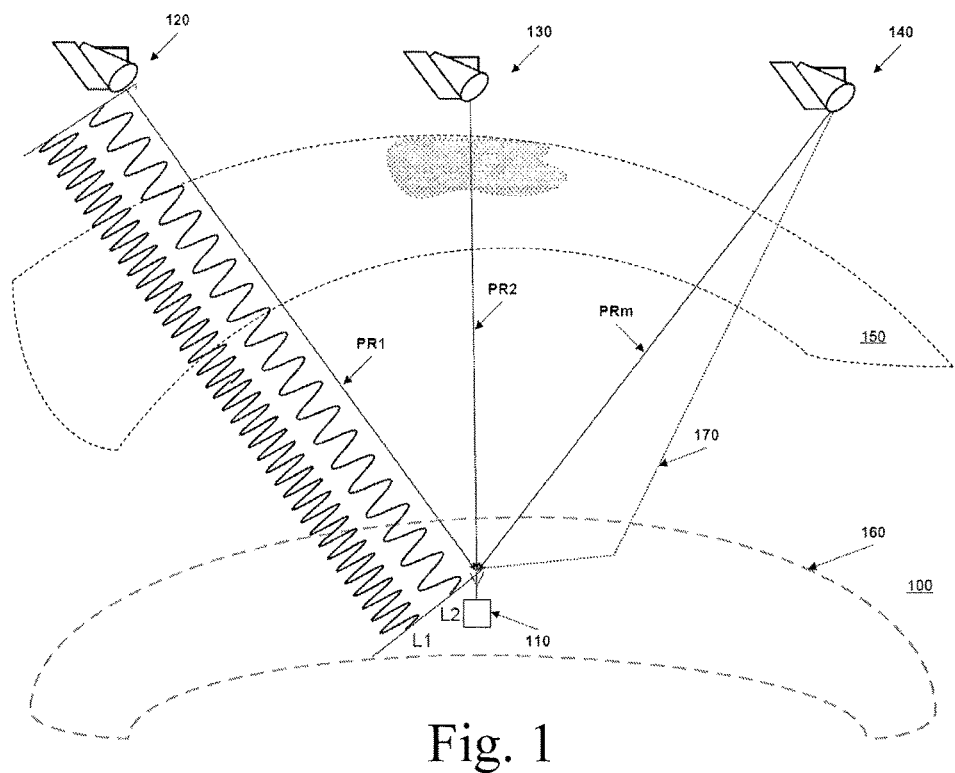
FIG. 1 schematically illustrates a typical prior art scenario to determine a rover position.
Figure 2:
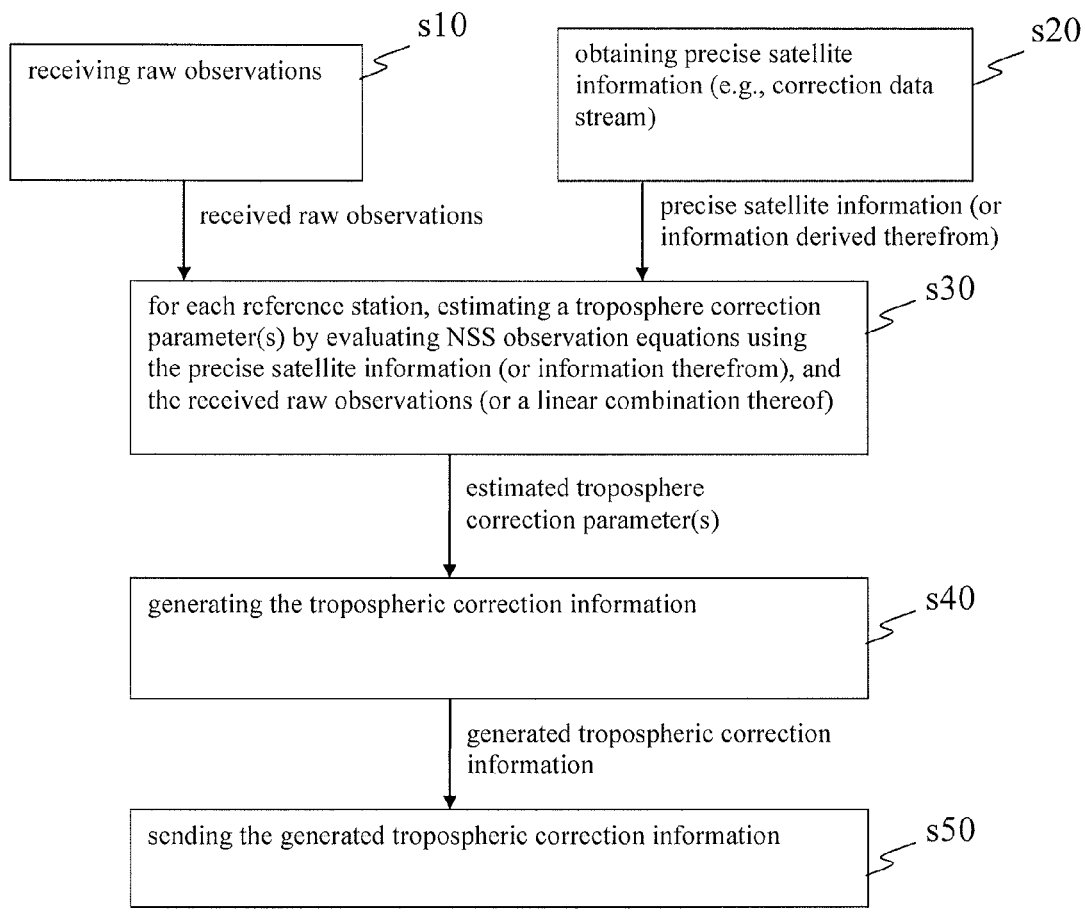
FIG. 2 is a flowchart of a method in one embodiment, the method being carried out for generating tropospheric correction information.

FIG. 2 is a flowchart of a method according to one embodiment of the invention. The method is carried out by a computer or set of computers for generating regional tropospheric correction information to be used to correct observations of at least one global or regional NSS receiver for example for a positioning process. The NSS receiver(s) may be static or moving and may be located, at one point in time, in a region of interest of the Earth's surface (e.g. on the Earth's surface, or above the Earth's surface somewhere in the troposphere). The region of the Earth's surface may for example be a spherical cap, but may also have a polygonal or elliptical shape, for example. By "region of interest", it is not meant here a layer of the troposphere extending between two altitudes (e.g. the lower region of the troposphere, the upper region of the troposphere, etc.) but rather a region corresponding to a tract of land or sea on earth. The size of the region of the Earth's surface comprises, in one embodiment, less than half of the Earth's surface. In a more specific embodiment, the size of the region of the Earth's surface under consideration comprises less than one fifth of the Earth's surface. In yet a more specific embodiment, the size of the region under consideration comprises less than one tenth of the Earth's surface.

The regional tropospheric correction information comprises information for correcting observations useful for estimating phase ambiguities and/or a position of the NSS receiver(s). The method may eventually lead to estimating the rover position, i.e. the position of the NSS receiver. The method may be performed by a network node or a plurality of network nodes.

In particular, the method comprises the following steps.

In step s10, for each of a plurality of reference stations in the region of interest, raw observations are received. The raw observations for each reference station are obtained by the reference station observing NSS multiple-frequency signals from a plurality of NSS satellites over multiple epochs. The plurality of NSS satellites may belong to the same navigation satellite system (e.g., GPS), or to more than one navigation satellite system (e.g., GPS and GLONASS). The plurality of reference stations together form a regional reference station network (also called "regional GNSS tracking network"). The raw observations are hereinafter referred to as "multiple-frequency-signals-based raw observations".

In step s20, precise satellite information is obtained, i.e. information on at least (i) the orbit position of each of the plurality of NSS satellites, and (ii) a clock offset of each of the plurality of NSS satellites. Alternatively, information derived from the precise satellite information may be obtained. For example, the information on the orbit position of the satellites can be represented by Keplerian elements and additional parameters. The precise satellite information typically originates from observations made by a global network of reference stations. Optionally, a set of biases associated with each of the plurality of NSS satellites is also obtained (as part of the precise satellite information). Furthermore, also optionally, a global ionosphere model is also obtained, which is applicable both within and outside the region of interest. In one embodiment, in addition to the optional global ionosphere model, an optional regional ionosphere model is also obtained, such as for example regional ionospheric correction information generated as described in reference [5]. The regional ionosphere model may cover the above-mentioned region of interest (i.e., the regional ionospheric correction information and the regional tropospheric correction information may cover the same region of interest). In another embodiment, a global ionosphere model is obtained but without any regional ionosphere model.

In step s30, for each of the plurality of reference stations (i.e., for each of the reference stations of the regional reference station network), at least one troposphere correction parameter is estimated by evaluating NSS observation equations. This step makes use of (i) the precise satellite information or, alternatively, the information derived from the precise satellite information, and (ii) the multiple-frequency-signals-based raw observations, or, alternatively, a linear combination of the multiple-frequency-signals-based raw observations. The above-mentioned set of biases and/or global ionosphere model, if obtained as part of the precise satellite information, may also be used for step s30, as the set of biases and global ionosphere model also provide useful information.

In other words, using the raw observations and the precise satellite information (or information derived therefrom), the at least one troposphere correction parameter is estimated by evaluating NSS observation equations for each reference station within the regional reference station network.

Step s30 may for example be carried in a parallel computing mode for each reference station. There is no need to run step s30 in a serial computing mode. Thus, the processing load grows only slowly with the number of reference stations, in the sense that the overall CPU time grows approximately linearly with the number of reference stations.

The purpose of the precise satellite information is to support the evaluation of the NSS observation equations to estimate the at least one troposphere correction parameter per reference station.

The term "observation equation" is well-known to a skilled person in the fields of signal processing, parameter estimation, and navigation satellite systems (NSS). An observation equation basically defines the relation between observed quantities and unknown parameters to be estimated.

By means of a so-called mapping function (that term will be explained further later on), one troposphere correction parameter per reference station is sufficient to account for the slant tropospheric delay affecting the received signals of all NSS satellites observed by that reference station. The troposphere correction parameter is typically estimated in the units the observation equation is given. Therefore, the tropospheric delay is usually expressed in meters. The tropospheric delay is in the range of 2.5 m for vertical observations at mean sea level (i.e. when the receiver is observing an NSS satellite which is vertically above the receiver) and could reach more than ten times that vertical delay for satellites observed at low elevations.

Examples for NSS observation equations are given by, but not limited to, equations (4a), (4b) and (5).

In step s40, the regional tropospheric correction information is generated based on the estimated troposphere correction parameter(s) per reference station. The regional tropospheric correction information comprises: (i) at least one mathematical function, each of which being hereinafter referred to as "regional tropospheric delay function", and (ii) its coefficients, hereinafter referred to as "regional tropospheric delay coefficients". The regional tropospheric delay function(s) and its regional tropospheric delay coefficients represent the tropospheric delay in the region of interest. The tropospheric delay is a delay affecting a NSS signal passing through the troposphere in the region of interest (at one point in time). In other words, in step s40, coefficients of a mathematical function are estimated to represent the troposphere correction parameter(s) in the region of interest.

The estimated troposphere correction parameter(s) of all reference stations are collected and processed to determine the at least one mathematical function and the initially unknown coefficients of the at least one mathematical function. The value of the function depends on the station position (e.g. its latitude and longitude). The processing approach used may be any kind of interpolation or approximation, such as for example using a least-squares parameter estimation or a Kalman filter approach.

In one embodiment, the tropospheric correction information comprises the regional tropospheric delay function(s) in an implicit manner, in the sense that the tropospheric correction information may for example indicate an index referring to a particular function among a plurality of possible functions. A rover station receiving the index (see step s160, described below with reference to FIG. 3) may then identify the applicable function (based on information stored on, or retrievable by, the rover station), and may proceed to make use of the tropospheric correction information (see steps s190/s200, described below with reference to FIG. 3). This is an efficient way to transmit the regional tropospheric delay function(s).

Figure 8:
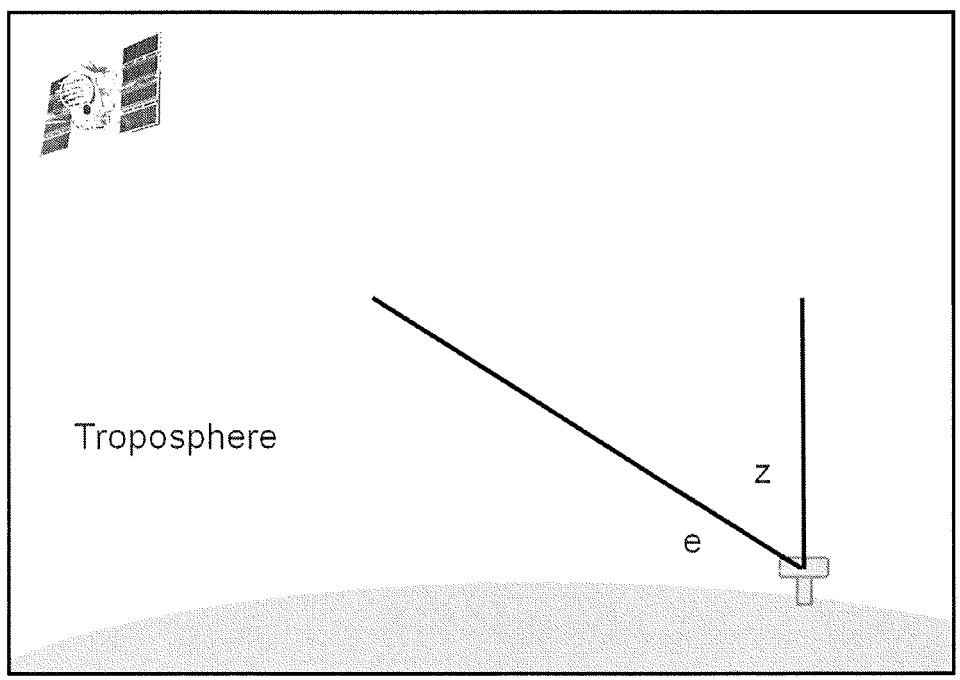
FIG. 8 schematically illustrates the relationship between a vertical troposphere correction parameter and the slant correction.

The regional tropospheric delay function(s) and its coefficients may for example represent a tropospheric zenith path delay (ZPD) parameter, which is a parameter suitable to be mapped to the elevation of a satellite-receiver-link so as to compute the tropospheric delay. The satellite-receiver-link is the link between a NSS receiver and a satellite from which signals are received by the NSS receiver. FIG. 8 schematically illustrates the relationship between a vertical troposphere correction parameter and the slant correction. From FIG. 8, one may easily derive a simple mapping function mf, i.e. $mf=1/\cos(z)=1/\sin(e)$. Alternatively, the regional tropospheric delay function(s) and its coefficients may represent a tropospheric scaling factor, i.e. a scaling factor suitable to be applied to a delay determined by an empirical a priori troposphere model (as discussed further below notably in section "The propagation of microwaves within the troposphere (and stratosphere)") to compute the tropospheric delay.

In one embodiment, the tropospheric ZPD parameter or the tropospheric scaling factor, whichever is represented by the at least one regional tropospheric delay function and its regional tropospheric delay coefficients, accounts for at least one of a hydrostatic tropospheric delay, a wet tropospheric delay, and a total tropospheric delay.

The regional tropospheric delay function(s) may for example each be in the form of a spherical harmonics expansion. In one embodiment, the regional tropospheric delay function(s) and its coefficients are obtained by an Adjusted Spherical Cap Harmonics Analysis technique, this technique being as such known in the art.

In step s50, the generated regional tropospheric correction information is sent to the NSS receiver(s) and/or to apparatus(es) in charge of processing observations from NSS receiver(s), for example for use in PPP applications. The regional tropospheric correction information may be transmitted in any kind of format, such as for example using Internet Protocol (IP) packets transmitted through a terrestrial radio link, a satellite link, or any other suitable communication link(s) (the same applies to the accuracy indicating information, discussed elsewhere in the present document). The accuracy of the regional tropospheric correction information is typically in the centimeter range (i.e., accurate in the range of a few centimeters), and the accuracy may also be, optionally, explicitly described by corresponding accuracy indicating information, such as accuracy indicators.

The generated regional tropospheric correction information that is sent (to a rover station, for example) as mentioned above in accordance with step s50 may take different forms in different embodiments, which may lead to the following considerations:

1) If tropospheric ZPD parameters are used, they may refer to a common height level. Therefore, they may be converted to a common height level by applying an adjustment formula prior to generating step s40. After step 50, i.e. when the rover station has already received the tropospheric correction information, the rover station may apply the same adjustment formula to consider for the rover height.
2) These adjustments are not necessary for implementing step s40 based on the tropospheric scaling factor, since height differences are already considered by the empirical a priori correction the tropospheric scaling factors refer to. Therefore, tropospheric scaling factors are more convenient to handle, at least in that respect.
3) In both cases 1) and 2), the transmitted tropospheric correction information can in general be used at an arbitrary height level, in theory kilometers above the Earth's surface. In practice, the accuracy might suffer significantly if the rover height differs considerably, such as for example by 1 km or more, from the height level of the nearby reference stations.

In one embodiment, the regional tropospheric correction information (including accuracy information, if applicable) is sent s50 periodically. In a sub-embodiment, the regional tropospheric correction information is sent s50 every 5 to 180 seconds, such as for example every 30 seconds.

In one embodiment, the step of estimating s30, for each of the plurality of reference stations, the troposphere correction parameter(s) is further based on the known position coordinates of the reference station, and/or at least partially resolved integer ambiguities in the carrier phase of the received multiple-frequency-signals-based raw observations.

In this embodiment, the ambiguities may be set to integer values and thus regarded as fixed (fixed solution). In particular, when the estimated ambiguities are sufficiently close to integer values (e.g., using a threshold), they are set to integer values. The threshold can be any small value, such as for example one tenth of a cycle. In another embodiment, the ambiguities are estimated and set to real number values (float solution). In another embodiment, not all but the majority of ambiguities are fixed. For the remaining ambiguities, float values are available. This embodiment or solution is understood as being "ambiguity resolved" in the following. In a broader sense, the ambiguity resolved solution may also include the ambiguity fixed solution as a particular case of the ambiguity resolved solution. Typically, the embodiments with the ambiguity resolved solution are preferred to the embodiments with the float solution, since the ambiguity resolved solution exploits the integer nature of the phase ambiguities and is therefore better, i.e. more accurate, than the float solution.

In one embodiment, the step of estimating s30, for each of the plurality of reference stations, the at least one troposphere correction parameter is further based on an ionospheric-free phase linear combination of the received multiple-frequency-signals-based raw observations. See for example equation (5) below.

In one embodiment, the step of generating s40 the tropospheric correction information further comprises: determining a mathematical function, hereinafter referred to as "regional accuracy indicating function", and its coefficients, hereinafter referred to as "regional accuracy indicating coefficients", based on the residuals of the regional tropospheric delay coefficients determination, wherein the regional accuracy indicating function and its regional accuracy indicating coefficients represent the vertical accuracy of the regional tropospheric delay function represented by the at least one regional tropospheric delay function and its regional tropospheric delay coefficients. In other words, the regional accuracy indicating function and its regional accuracy indicating coefficients are estimated to quantify the vertical accuracy of the tropospheric delay represented by the troposphere correction information generated in step s40 based on the residuals of the generation of step s40.

Figure 5:
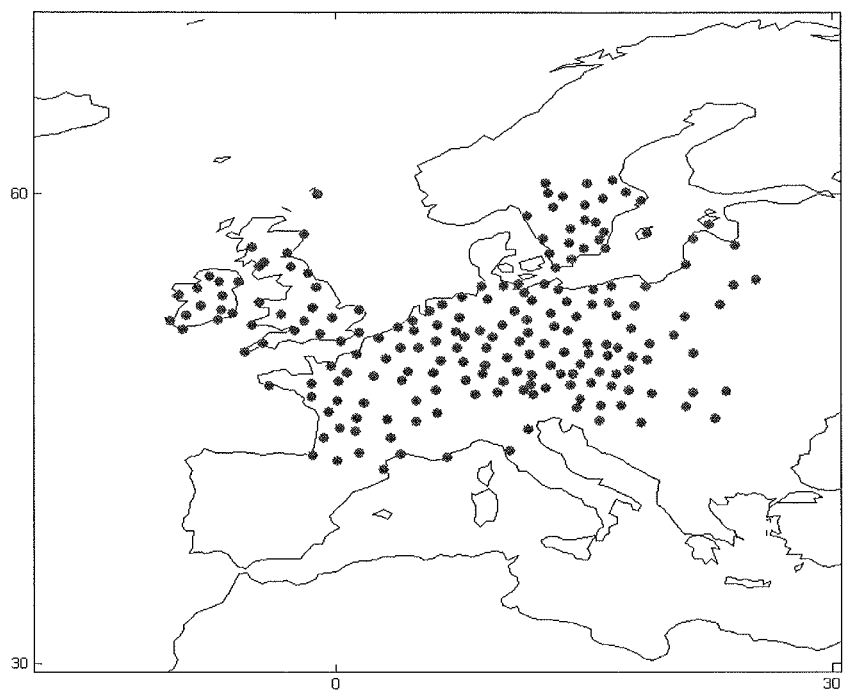
FIG. 5 schematically shows the location of a plurality of the reference stations in Central Europe, in one embodiment.

In one embodiment, an additional step is performed between steps s30 and s40, namely between the estimation s30 of troposphere correction parameter(s) per reference station of the regional reference station network and the generation s40 of the tropospheric correction information for the whole region of interest in the form of regional tropospheric delay function(s) and regional tropospheric delay coefficient(s). The additional step comprises the computation of artificial troposphere correction parameters for the mostly "unobserved" sub-regions of the region of interest (i.e. the sub-regions of the region of interest where there is no reference station) based on the troposphere correction parameters estimated in step s30. The artificial troposphere correction parameters are then used in step s40 together with the troposphere correction parameter(s) per reference station. This additional step is advantageous in that it enables to stabilize the generation s40 of the tropospheric correction information, i.e. to obtain more realistic regional tropospheric delay functions and coefficients. In other words, the generation s40 is improved by pseudo-observations corresponding to the artificial troposphere correction parameters. This will be further explained below with reference to FIGS. 5 to 7 and in the section "2a. Adding pseudo-observations" below.

Figure 3:
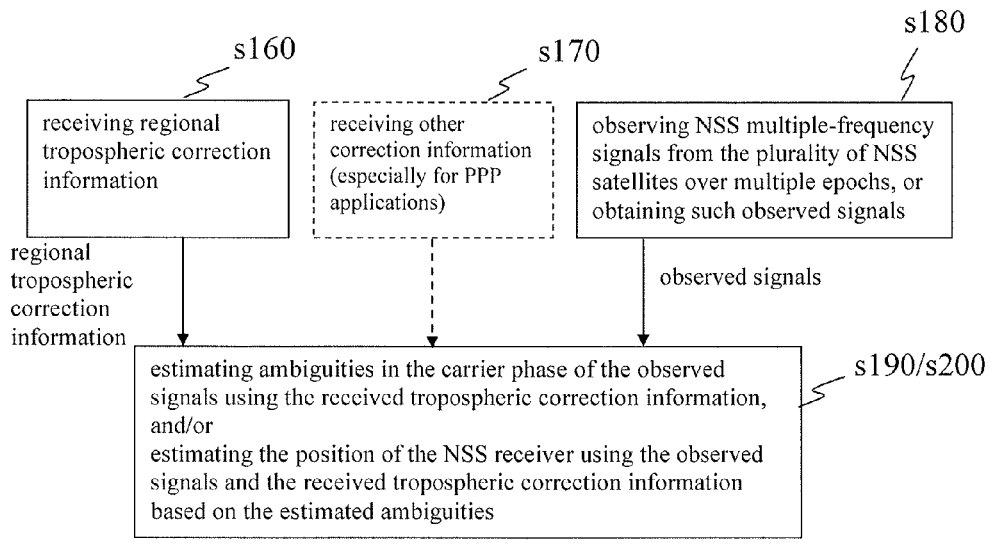
FIG. 3 is a flowchart of a method in one embodiment, the method making use of tropospheric correction information.

FIG. 3 is a flowchart of a method according to one embodiment. The method is carried out by an apparatus, which may be a NSS receiver or a server in charge of processing observations from NSS receiver(s), and comprises the following steps.

In step s160, regional tropospheric correction information is received. The regional tropospheric correction information comprises: (i) at least one regional tropospheric delay function, and (ii) its regional tropospheric delay coefficients. The regional tropospheric delay function(s) and its regional tropospheric delay coefficients represent the tropospheric delay in a region of interest of the Earth's surface.

In step s180, NSS multiple-frequency signals from the plurality of NSS satellites are observed over multiple epochs, or the apparatus receives such observations from a NSS receiver.

Then, steps s190 and/or s200 are performed: In step s190, ambiguities in the carrier phase of the observed signals are estimated using the received regional tropospheric correction information. In step s200, the position of the NSS receiver is estimated using the observed signals and the received regional tropospheric correction information.

In one embodiment, an optional step s170 (as illustrated in FIG. 3 with a dashed box) is carried out in which the apparatus receives further correction information (hereinafter referred to as "other correction information"). The other correction information may comprise precise satellite orbit and clocks, i.e. information on: a) the orbit position of each NSS satellites (or information derived therefrom), and b) a clock offset of NSS satellites (or information derived therefrom). Providing this additional correction information is particularly useful for PPP applications.

Furthermore, the so-called other correction information may also comprise, optionally, satellite phase biases. Providing this additional information is particularly useful for integer ambiguity resolution.

Yet furthermore, the so-called other correction information may also comprise, optionally, other atmospheric corrections (such as for example global ionospheric correction information and/or regional ionospheric correction information, as discussed in reference [5]). Providing this additional information is particularly useful for a fast converging positioning solution.

Figure 4:
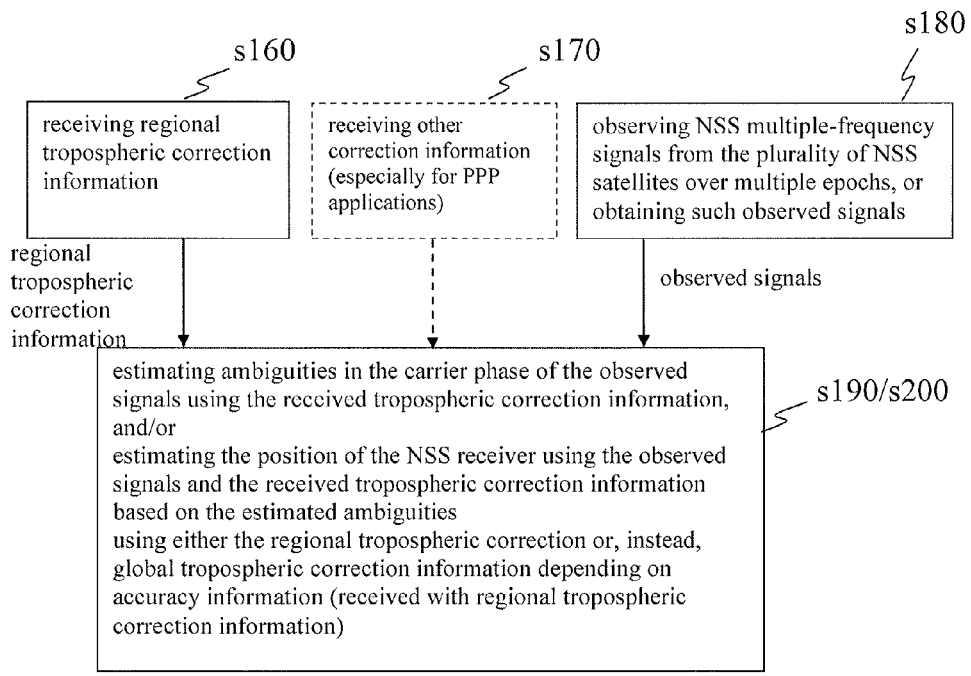
FIG. 4 is a flowchart of a method in one embodiment, the method making use of tropospheric correction information if applicable and considered valid.

FIG. 4 is a flowchart of a method according to one embodiment, which notably comprises, compared to the steps described with reference to FIG. 3, a modified step s190/s200.

In this embodiment, the regional tropospheric correction information further comprises a mathematical function (here referred to as "regional accuracy indicating function") and its coefficients (here referred to as "regional accuracy indicating coefficients"). The regional accuracy indicating function and its regional accuracy indicating coefficients represent the vertical accuracy of the tropospheric delay represented by the regional tropospheric delay function(s) and its coefficients.

Furthermore, in this embodiment, step s190 of estimating ambiguities in the carrier phase of the observed signals, and/or step s200 of estimating the position of the NSS receiver using the observed signals, make use of either the regional tropospheric correction information or global tropospheric correction information, i.e. tropospheric correction information applicable to any region of the Earth's surface. The global tropospheric correction information may comprise tropospheric correction information generated from empirical models (e.g. Saastamoinen) and stored (e.g., hard-coded) in the apparatus (e.g., rover) carrying out the steps of FIG. 4. The decision as to whether to use the regional tropospheric correction information or, instead, the global tropospheric correction information may be based on whether the regional tropospheric correction information is available (correction data received and NSS receiver within the defined region of interest, such as e.g. within cap definition) and is considered valid (based on whether the indicated accuracy information is sufficiently high, such as for example based on whether an accuracy expressed by a standard deviation is below a threshold). If the regional tropospheric correction information is available and is considered valid, then the regional tropospheric correction information is used. Otherwise, the global tropospheric correction information is used.

Therefore, the regional tropospheric correction information (representing regional tropospheric correction models) can be regarded as a regional augmentation to the global tropospheric correction information.

Let us now further explain the context in which some embodiments of the invention have been developed, for a better understanding thereof.

Troposphere Modelling in the Context of Relative Positioning (Post-Processing)

The user manual of the Bernese GNSS processing software (i.e., "User manual of the Bernese GPS Software Version 5.0", Astronomical Institute, University of Bern, January 2007, edited by Rolf Dach, Urs Hugentobler, Pierre Fridez, Michael Meindl, retrieved in July 2015 from http://www.bernese.unibe.ch/docs50/DOCU50.pdf, and hereinafter referred to as "reference [6]") explains how the troposphere is typically modelled in relative positioning (in post-processing) (see especially chapter 11). It is typically recommended to use the dry or hydrostatic part of the zenith path delay (ZPD), mapped to the slant by a dry mapping function as empirical a priori troposphere correction and to estimate the wet part of the ZPD using a wet mapping function (the fundamentals of troposphere estimation are explained later on in more detail). For single baselines and small networks, it is typical to perform a relative troposphere estimation. In this approach, the empirical a priori troposphere correction of one GNSS station is fixed and all the estimated ZPDs are related to this fixed one. For large networks with long observation periods, it is possible to estimate ZPD for all reference stations. In this case, the estimated ZPD delays can be considered as absolute.

As an alternative to the estimation of the wet ZPD, it is also possible to estimate so-called tropospheric scaling factors. In that approach, a scaling factor relative to the empirical a priori troposphere correction is estimated (see also paragraph discussing reference [7] below).

Troposphere Modelling in the Context of PPP

In the "Background" section (see especially references [4] and [5]), it has been explained that the availability of an accurate ionosphere model reduces the rover convergence time in PPP applications. To reach the accuracy level necessary for a significant reduction of the convergence time, the ionosphere models being used are derived from GNSS observation data. The situation is very different for troposphere correction models. The methods known in the art make use of empirical a priori models. Such models were published e.g. by Hopfield or Saastamoinen, see e.g. reference [1], pp. 130-137. Based on such empirical a priori models, troposphere delay parameters are estimated. The functional models used are typically the same as in relative positioning (estimation of ZPD or tropospheric scaling factors). In contrast to relative positioning however, the estimated troposphere parameters in PPP always refer to an absolute level since PPP is an absolute positioning approach.

Network-RTK (Relative Positioning in Real-Time (RT))

The common-mode errors of GNSS positioning (i.e., the errors common to all satellite measurements) are orbit errors and signal propagation time errors caused by the atmosphere. Common-mode errors are nearly identical for close nearby stations and the difference between the errors grows with the distance between the two GNSS stations. In network RTK, a network of reference stations is not used to simply select the closest reference station for the relative positioning of a rover station although that would indeed reduce the common-mode errors. A main feature of network RTK is the estimation of common-mode errors at the reference stations based on fixed double-difference ambiguities. Afterwards, the errors are interpolated for the location of the rover station. Since the error reduction by interpolation is better than the reduction by observation differencing, the spacing between reference stations can be increased to 50-100 km. The most popular methods of Network RTK are Area Correction Parameters (ACP), Virtual Reference Station (VRS) (Landau, H., Vollath, U., Chen. X, "*Virtual Reference Station Systems*", Journal of Global Positioning Systems (2002) Vol. 1, No. 2: 137-143), and Master Auxiliary Concept (MAC) (Brown et al., "*RTK Rover Performance using the Master-Auxiliary Concept*", Journal of Global Positioning Systems (2006), Vol. 5, No. 1-2: 135-144). In all these methods, finally the observation data of one or several reference stations are transmitted to the rover. Also the approximate rover position is transmitted typically to the Network RTK service provider firstly in all the methods to select or compile the observation data being useful for the rover location and to transmit only that data from the service provider to the user.

The troposphere correction used explicitly (ACP method) or implicitly (VRS method) might be based on double-difference ambiguities and therefore on double-difference residuals. In this case, the corrections are relative; they are not related to a troposphere delay correction with an absolute level.

Alternatively, the troposphere correction might be derived from an absolute ZPD parameter or an absolute tropospheric scaling factor respectively if the network size is large enough (see Vollath, U., Brockmann, E., Chen, X., "*Troposphere: Signal or Noise?*," Proceedings of the 16th International Technical Meeting of the Satellite Division of The Institute of Navigation (ION GPS/GNSS 2003), Portland, Oreg., September 2003, pp. 1709-1717, hereinafter referred to as "reference [7]"). The above-described principles of troposphere estimation in relative positioning are not restricted to post-processing in general.

GNSS Signal Processing with Regional Augmentation

A VRS method requires the rover to send the approximate position to a server so that the server can generate the geometric and ionospheric corrections for the rover location. In contrast, a MAC method does not require the transmission of such approximate positions, and is designed to be a broadcast method which transmits all reference station data to the rover station, and the rover station computes the correction for its location. However, due to the bandwidth constraints, transmitting MAC data from a large number of reference stations is impractical using wireless technology.

In contrast to VRS and MAC methods, international applications WO 2011/126605 (hereinafter referred to as "reference [8]"), WO 2011/100680 (hereinafter referred to as "reference [9]"), and WO 2011/100690 (hereinafter referred to as "reference [10]") describe methods to derive a set of corrections based on fixed double-difference ambiguities between reference stations in the regional network. The corrections enable the reconstruction of code and phase observations of the reference stations. The ability to reconstruct the geometric part (ionospheric-free observation combination) is based on the phase-leveled geometric term per satellite. This geometric correction term encapsulates the integer nature of the ambiguity and compensates the orbit error and satellite clock error seen in the regional reference station network. The non-ionospheric part of the regional network correction comprises the code biases, phase-leveled geometric correction and optionally one tropospheric scaling factor per reference station. The generation of tropospheric rover corrections from the transmitted scaling factors is done by the rover station; i.e. on the rover station, the scaling factors of the nearby reference stations are selected and used to derive the tropospheric correction for the rover station by interpolation.

The ionospheric part of the regional reference station network correction is derived from the ionospheric carrier phase dual frequency combination minus the ambiguity determined from the processing the regional network observations.

Let us now describe in more details some technical considerations useful for understanding some embodiments of the invention.

The Propagation of Microwaves within the Troposphere (and Stratosphere)

The troposphere is the lowest atmospheric layer which ranges to an altitude of approximately 12 km. The subsequent atmospheric layer is the stratosphere which ends at an altitude of approximately 50 km. Troposphere and stratosphere contain nearly the complete atmospheric mass. The gas molecules located therein are electrically neutral. Within the troposphere and stratosphere, the propagation velocity of microwaves depends on the mass density. The effect on the NSS signal propagation time is non-dispersive, i.e. it does not depend on the frequency within the range of NSS signals. Moreover, it is always a delay which is the same for code and phase observations. Since the impact of the troposphere and stratosphere is in general similar, both atmospheric layers are typically denoted in the context of GNSS signal propagation and processing under the name "troposphere" (as explained e.g. in reference [1], section 5.3.3, first paragraph). The only relevant difference is that the stratosphere contains no water vapor since clouds reside in the troposphere only.

The slant delay may be expressed by the zenith path delay (ZPD) multiplied with a troposphere mapping function. Moreover, due to the different properties of troposphere and stratosphere, there is always a separation between the dry part, i.e. the hydrostatic part, and the wet part, i.e. the part caused by water vapor (see e.g. reference [1], section 5.3.3). Therefore, a general equation to describe the slant tropospheric delay T may be given by $$T = ZPD_d \cdot mf_d \cdot ZPD_w \cdot mf_w \tag{1}$$

The dry ZPD (i.e., $ZPD_d$) and wet ZPD (i.e., $ZPD_w$) can be provided a priori by empirical correction models, e.g. from Hopfield or Saastamoinen, or by correction models derived from GNSS data processing. According to reference [1] (see equations 5.104 on page 132), the mapping to arbitrary elevations e can be computed in a simply way by the sine of elevation e as follows:

$$mf_d = 1/\sin\sqrt{e^2 + 6.25} \tag{2a}$$

$$mf_w = 1/\sin\sqrt{e^2 + 2.25} \tag{2b}$$

Typically however, much more sophisticated mapping functions may be used, such as e.g. the Niell mapping function (Niell A. E., "*Global Mapping Functions for the Atmosphere Delay at Radio Wavelengths*", Journal of Geophysical Research (1996), 101(B2), S. 3227-3246, hereinafter referred to as "reference [11]"). The best correction for the troposphere delay is given by high-quality a priori values for the dry and wet ZPD (typically derived from GNSS data processing whereas the observations data is collected from a dense network of reference stations) multiplied with a sophisticated mapping function.

Simplified Saastamoinen Model

A simplified formula for the Saastamoinen troposphere correction model is given by equations (3a) and (3b):

$$ZPD = 2.277 \cdot 10^{-3} \cdot \left[ p + \left( \frac{1255}{\text{Temp}} + 0.05 \right) \cdot wvp \right] \tag{3a}$$

$$ZPD = \tag{3b}$$
$$2.277 \cdot 10^{-3} \cdot p + 2.277 \cdot 10^{-3} \cdot wvp \cdot \left( \frac{1255}{\text{Temp}} + 0.05 \right) = ZPD_d + ZPD_w$$

where

ZPD is the zenith path delay, i.e. the vertical delay, in metric length units;

$ZPD_d$ is the dry (or so called hydrostatic) ZPD;

$ZPD_w$ is the wet ZPD;

p is the air pressure at the observation site in units of mbar or hPa;

Temp is the air temperature at the observation site in units of Kelvin; and wvp is the water vapor pressure at the observation site in units of Kelvin.

In view of equation (3b), it is apparent that the hydrostatic ZPD depends only on the air pressure, whereas the wet part depends mainly on the water vapor pressure and additionally on the temperature.

Since there is no water vapor in the stratosphere, there is no contribution of the stratosphere to the wet ZPD. In contrast, the hydrostatic ZPD originates from both tropospheric and stratospheric causes.

Meteorological Data

In order to use the Saastamoinen troposphere correction model, the meteorological data p, Temp, and wvp are needed. A convenient way to obtain said data is through a Standard Atmosphere providing constant meteorological values at the mean sea level and their vertical gradients. For instance with an air pressure of 1013.25 hPa and an air temperature of 15° C., as provided by the U.S. Standard atmosphere, and a water vapor pressure of 8.5 hPa, derived from the given temperature and a relative humidity of 50%, the $ZPD_d$ is 2.31 m, the $ZPD_w$ is 8 cm, and the total ZPD is 2.39 m (at mean sea level). More sophisticated meteorological models, such as e.g. the GPT model (J. Boehm, R. Heinkelmann, and H. Schuh, "*Short Note: A global model of pressure and temperature for geodetic applications*", Journal of Geodesy (2007), doi:10.1007/s00190-007-0135-3) or the GPT2w model (J. Böhm, G. Möller, M. Schindelegger, G. Pain, R. Weber, "*Development of an improved blind model for slant delays in the troposphere (GPT2w)*", GPS Solutions, 2014, doi: 10.1007/s10291-014-0403-7), consider also the seasonal and spatial variations of the meteorological data. These models also provide vertical gradients for the meteorological data.

Carrier-Phase Observations

GPS L1 and L2 carrier phase observations may be expressed as:

$$L_1 = \lambda_1 \varphi_1 = \rho + T + I_1 + c \cdot (t_r - t^s) + b_1^r - b_1^s + \lambda_1 N_1 + v_1 \tag{4a}$$

$$L_2 = \lambda_2 \varphi_2 = \rho + T + \frac{\lambda_2^2}{\lambda_1^2} I_1 + c \cdot (t_r - t^s) + b_2^r - b_2^s + \lambda_2 N_2 + v_2 \tag{4b}$$

where $L_1$ and $L_2$ are respectively the L1 and L1 carrier phase observations in metric length units, $\lambda_1$ and $\lambda_2$ are the wavelengths of the L1 and L2 carrier phase observations in metric length units, $\varphi_1$ and $\varphi_2$ are the L1 and L2 carrier phase observations in cycles, $\rho$ is the geometric range between antenna phase centers of satellite and receiver, T is the slant tropospheric delay in metric units of length, $l_1$ is the slant L1 ionospheric delay in metric units of length, c is the speed of light in vacuum, $t^s$ and $t_r$ are the satellite clock error and receiver clock error, respectively, $b_1^s$ and $b_2^s$ are the satellite L1 phase bias and satellite L2 phase bias, respectively, $b_1^r$ and $b_2^r$ are the receiver L1 phase bias and satellite L2 phase bias, respectively, $N_1$ and $N_2$ are L1 and L2 integer ambiguities, respectively, and $v_1$ and $v_2$ are phase noise plus multipath of L1 and L2, respectively.

In GNSS positioning approaches, the determination of the rover position coordinates is of primary interest, whereas the coordinates are initially unknown and therefore estimated. As already mentioned, the quickest method to converge to an accurate position is the determination of the L1 and L2 integer ambiguities. The ambiguity determination is improved and succeeds earlier if, besides the ionospheric delay, the tropospheric delay is also removed or at least reduced significantly by high-quality correction models.

Ionospheric-Free Linear Combination of Carrier Phase Observations

Artificial observations can be computed from the original ones, i.e. from the raw observations, by forming linear combinations. Those linear combinations have different properties compared to the original observations. The ionospheric-free linear combination $L_{IF}$ is given by $$L_{IF} = \frac{f_1^2}{f_1^2 - f_2^2} L_1 - \frac{f_2^2}{f_1^2 - f_2^2} L_2 = \\ \rho + T + c \cdot (t_r - t^s) + b_{IF}^r - b_{IF}^s + \lambda_{IF} N_{IF} + v_{IF} \quad (5)$$

where $f_1$ and $f_2$ are the frequencies of L1 and L2 signals respectively. In line with the previous explanations of equations (4a) and (4b), $b_{IF}^r$ is the ionospheric-free receiver phase bias, $b_{IF}^s$ is the ionospheric-free satellite phase bias, $\lambda_{IF}$ is the wavelength of the ionospheric-free linear combination in metric length units, $N_{IF}$ is the ionospheric-free integer ambiguity, and $v_{IF}$ is the phase noise plus multipath of $L_{IF}$.

Troposphere Delay Estimation Based on NSS Observation Data

With ionospheric-free linear combinations as expressed by equation (5), it is in general possible to estimate tropospheric parameters.

In the following, the usual ways of troposphere estimation are outlined:

1. Estimating wet ZPD: Typically the dry part of equation (1) is used as empirical a priori correction since the dry part is the major contribution to the total delay. Additionally, the wet part is fluctuating much more than the dry part with space and time. Therefore, the wet ZPD is estimated by means of known values for the wet mapping function.

2. Estimating remaining part of the wet ZPD: Also the total delay given by equation (1) may be introduced as empirical a priori troposphere correction. By means of known values for the wet mapping function, the remaining part of the wet ZPD is estimated.

3. Estimating total tropospheric scaling factor: The relationship between the given empirical a priori correction $T_{apriori}$ and the estimated correction $T_{aposteriori}$ can also be described by a tropospheric scaling factor scale:

$$T_{aposteriori} = \text{scale} \cdot T_{apriori} = (1+ds)T_{apriori} = T_{apriori} + ds \cdot T_{apriori} \quad (6a)$$

The empirical a priori troposphere delay $T_{apriori}$, basically given by equation (1), is used both for the empirical a priori correction $T_{apriori}$ (first summand) and to estimate the unknown part ds.

4. Estimating wet tropospheric scaling factor: In contrast to the previous approach, the tropospheric scaling factor may refer to the wet part exclusively as follows:

$$T_{aposteriori} = T_{apriori}^{dry} + \text{scale}^{wet} \cdot T_{apriori}^{wet} = T_{apriori}^{dry} + T_{apriori}^{wet} + ds^{wet} \cdot T_{apriori}^{wet} \quad (6b)$$

The empirical a priori troposphere delay $T_{apriori} (= T_{apriori}^{dry} + T_{apriori}^{wet})$ is again given by equation (1), whereas the unknown part $ds^{wet}$ is estimated by means of the wet a priori delay.

Spherical Harmonics

Spherical harmonics (SH) provide a value dependent on the latitude and longitude, i.e. scalar quantities on a sphere can be expressed with SH. Therefore, spherical harmonics expansions are often used in earth sciences to represent global fields (e.g. the global gravitation field and global magnetic field are often expressed using spherical harmonics expansions). The spherical harmonics expansion can be written as:

$$F_{(\Phi,\Lambda)} = \sum_{n=0}^{N_{max}} \sum_{m=0}^{n} [(C_{n,m} \cdot \cos(m\Lambda) + S_{n,m} \cdot \sin(m\Lambda)) \cdot P_{n,m(\Phi)}] \quad (7)$$

where $F_{(\Phi, \Lambda)}$ is the value of the spherical harmonics expansion for a dedicated point, $\Phi$ and $\Lambda$ are the latitude and longitude of the dedicated point on the sphere, n and m are the degree (n) and order (m) of the spherical harmonics expansion, $N_{max}$ is the maximum degree of the spherical harmonics expansion, $C_{n,m}$ and $S_{n,m}$ are the coefficients of the spherical harmonics expansion, and $P_{n,m(\Phi)}$ are the Associated Legendre Polynomials.

The Associated Legendre Polynomials are known functions, whereas the coefficients of the spherical harmonics expansion are initially unknown and have to be determined by a corresponding GNSS parameter estimation approach. The number of coefficients or summands, and thus the resolution of the expansion, is controlled by the selected maximum degree.

Adjusted Spherical Cap Harmonics Analysis (ASHA) Technique

In general, ASHA means using spherical harmonics in a spherical cap, as explained for example in De Santis A., Chiappini M., Dominici G. & Meloni A., "*Regional Geomagnetic Field Modelling: the contribution of the Istituto Nazionale di Geofisica*", Annali di Geofisica, Vol. XL, 5, 1161-1169, 1997. Therefore, it is necessary to transform the spherical coordinates given by the latitude and longitude (originally given on the complete sphere) into another coordinate system which is suitable or valid respectively only inside the cap. First of all, the azimuth and spherical distance of an arbitrary point inside the cap with respect to the cap center are computed. Afterwards, the cap center can be considered as the pole of a sphere, the azimuth as longitude and the spherical distance as co-latitude, because on a sphere a spherical distance is always also an angle at center. Therefore, the maximum value for the co-latitude is the radius of the cap. In a next step, the cap is mathematically enlarged to a hemisphere. This is done by scaling the co-latitude by the ratio between the cap radius and 90 degrees. Finally, the azimuth and the scaled co-latitude describe a spherical coordinate system on a hemisphere (azimuth=$\lambda_{ASHA}$, scaled co-latitude=$90°-\varphi_{ASHA}$). Therefore, spherical harmonics as given by equation (7) can be used to describe a scalar function on the spherical cap whereas $\Lambda$ is replaced by $\lambda_{ASHA}$ and $\Phi$ is replaced by $\varphi_{ASHA}$.

Determine ASHA Coefficients from Observations Inside the Cap

In general, it is possible to estimate the coefficients of equation (7) from observations by a parameter estimation approach (for example, a least-squares parameter estimation or a Kalman filter approach). But by doing so, the second hemisphere is always completely without observations. This configuration defect causes numerical problems (the matrix responsible for the parameter estimation solution is nearly singular; the problem is called "ill-conditioned"). In the spherical harmonics theory, there is a group of coefficients which contributes to the spherical harmonics sum in an equator-symmetric way, see e.g. Torge and Mueller, *Geodesy*, de Gruyter Verlag, 2012, 4$^{th}$ edition. The above-described problem can be solved by using only these coefficients.

Approximation and Interpolation of Troposphere Correction Parameters

The observations of a parameter estimation approach in terms of the previous section may simply be troposphere correction parameters of a regional reference station network. This is one possible implementation of step s40, already described above, in order to generate the tropospheric correction information (the regional tropospheric delay function and its regional tropospheric delay coefficients).

Adjustment Formula to Refer ZPD Parameters to a Common Height Level

The potential need to refer estimated ZPD parameters to a common height level by an adjustment formula was already mentioned above. A possible implementation of that adjustment formula may be discussed as follows.

Let us assume, in an example, that the reference stations have station heights between 55 m and 1238 m above mean sea level and it is decided to introduce a common height level of 500 m. For every station, the empirical a priori delay is computed, e.g. by equations (3a) and (3b) twice, whereas the meteorological values used therein have to be requested both for the actual station height and for a station height of 500 m (representing the common height level). For every station, the ratio of those two empirical a priori delays is simply the ratio which needs to be applied to the estimated ZPD parameter to refer it to the common height level.

Let us now describe an embodiment of the invention, which is aimed at estimating the regional tropospheric correction models (i.e., the regional tropospheric correction information).

This embodiment aims at providing troposphere correction models derived from a regional GNSS tracking network. The accuracy of the troposphere correction model is in the millimeter to centimeter range and may optionally be explicitly described by a corresponding accuracy indicator. The main application of this improved troposphere correction model is its usage within precise point positioning (PPP) to especially reduce the convergence time in the vertical direction (i.e., the altitude or, in other words, the height component).

1. PPP Troposphere Estimation in the Regional Reference Station Network (i.e., a Possible Implementation of Step s30)

We now may consider the usage of equation (5) for troposphere estimation for a reference station. The satellite clock error and the phase bias may be known by a suitable PPP correction stream as for example described in references [3], [4] and [5]. The remaining unknowns in equation (5) are the receiver clock and bias, the reference station position (part of the unknown geometric range $\rho$, which is basically the vector between the known orbit position and the unknown reference station position), the ambiguities and the troposphere parameter, whereas a common estimation of all those parameters is possible using the ionospheric-free linear combination from multiple satellites at multiple observation epochs. This estimation approach does not necessarily aim for ambiguity resolution and is hereinafter referred to as "initial approach". Since PPP is an absolute positioning approach, the estimated troposphere parameters refer to an absolute level.

Thanks to the PPP correction data and the typically known reference station coordinates, it is possible to refine the above-described initial approach. By introducing the known reference station coordinates, they are no longer unknown and the estimation of the remaining unknown gets improved by this. Additionally, thanks to the known satellite phase biases and the known reference station coordinates, ambiguity resolution may be performed, since it is very promising under these conditions (i.e., a very successful ambiguity resolution or, in other words, a very high ambiguity fixing success rate, may be expected). Afterwards, the finally remaining unknowns in equation (5) are the receiver clock and bias as well as the troposphere parameter. Compared to the initial approach, the number of unknown parameters is clearly reduced and the troposphere parameter can be estimated very accurately and reliably.

The above-described considerations may also be expressed in a mathematical way, providing an even more precise understanding to a skilled person in the field of NSS data processing. One example of estimating total tropospheric scaling factor is given as follows. With precise orbit (satellite position $x^s$, $y^s$, $z^s$), satellite clock error $t^s$ and ionospheric-free bias $b_{IF}^s$, combining equations (5) and (6a), we get $\bar{L}_{IF}$, which is the ionospheric-free linear combination $L_{IF}$ (see equation (5)) minus the quantities known or computed from the precise satellite information:

$$\bar{L}_{IF} = L_{IF} - \rho^0 - T_{apriori} + b_{IF}^s + t^s = \frac{x^s - x_0}{\rho^0} dx + \frac{y^s - y_0}{\rho^0} dy + \qquad (8)$$

$$\frac{z^s - z_0}{\rho^0} dz + T_{apriori} \cdot ds + c \cdot (t_r + b_{IF}^r) + \lambda_{IF} N_{IF}^r + v_{IF}$$

where $x_0$, $y_0$, $z_0$ is the approximate position of the receiver antenna phase center, $\rho^0 = \sqrt{(x^s-x_0)^2+(y^s-y_0)^2+(z^s-z_0)^2}$, and dx, dy, dz are the estimated position errors relative to the approximate position.

With ionospheric-free observations from multiple satellites, multiple epochs, the total tropospheric scaling factor can be estimated together with receiver antenna position and ionospheric-free ambiguities based on observation equation (8) through i.e. a Kalman filter estimator. The sum of the receiver clock and the ionospheric-free receiver phase bias ($c \cdot t_r + b_{IF}^r$) is typically assumed as a white noise process, i.e. it is reset every epoch. In other words, the sum of the receiver clock and the ionospheric-free receiver phase bias is typically handled as bias parameter, estimated every epoch freshly.

When the position of the receiver antenna phase center is known (i.e. when using a reference station), dx,dy,dz can be removed from equation (8), and the accuracy of estimated tropospheric scaling factor is improved since fewer parameters are to be estimated in the filter.

The accuracy of estimated tropospheric scaling factor can be further improved by ambiguity resolution. If the estimated tropospheric scaling factor, float ambiguities and associated covariance matrix are:

$$\begin{bmatrix} \tilde{d}s \\ \tilde{N}_{IF} \end{bmatrix} \text{ and } \begin{bmatrix} Q_{ds} & Q_{ds,N} \\ Q_{ds,N}^T & Q_N \end{bmatrix} \quad (9)$$

where $\tilde{d}s$ is the estimated tropospheric scaling factor and $\tilde{N}_{IF}$ are the estimated float ambiguities.

$$\begin{bmatrix} Q_{ds} & Q_{ds,N} \\ Q_{ds,N}^T & Q_N \end{bmatrix}$$

are the covariance matrix of the estimated tropospheric scaling factor and ambiguities. Where $Q_{ds}$ is the variance of estimated tropospheric scaling factor, $Q_N$ is the covariance matrix for the estimated float ambiguities. $Q_{ds,N}$ is the covariance between estimated tropospheric scaling factor and ambiguities.

With fixed ambiguities $\hat{N}_{IF}$, the thereby constrained tropospheric scaling factor as and the correspondent variance $Q_{ds}$ are:

$$\hat{d}s = \tilde{d}s - \lambda_{IF} Q_{ds,N} Q_N^{-1} (\tilde{N}_{IF} - \hat{N}_{IF})$$

$$\hat{Q}_{ds} = Q_{ds} - \lambda_{IF}^2 Q_{ds,N} Q_N^{-1} Q_{ds,N}^T \quad (10)$$

Equations (10) show both a changed value for the tropospheric scaling parameter ds and also a reduced standard deviation (indicated by smaller matrix elements in $\hat{Q}_{ds}$ compared to $Q_{ds}$).

The skilled person in the field of NSS data processing will easily see the possibility to replace the mathematical model of the total tropospheric scaling factor by an alternative one. Especially, the mathematical models of estimating wet ZPD, remaining part of the wet ZPD and wet tropospheric scaling factor, already discussed in the section "Troposphere delay estimation based on NSS observation data", can be derived in a similar way.

2. ASHA Representation of Tropospheric Scaling Factors (i.e., a Possible Implementation of Step s40)

Above-described step 1 (ambiguity fixing and troposphere estimation) is running continuously in the regional reference station network. Thus, a current estimation for one troposphere parameter per station (ZPD or tropospheric scaling factor), which refers to an absolute level and which is also in agreement with the integer-ambiguity-leveled PPP corrections used in step 1, is continuously available. The troposphere parameters of all network stations (i.e. all reference stations) are the observations used to determine ASHA coefficients by parameter estimation (see section "Determine ASHA coefficients from observations inside the cap") according to equation (7). Since the troposphere parameters are related to the reference stations, their ground coordinates are transformed into the ASHA coordinate system ($\lambda_{ASHA}$ and $\varphi_{ASHA}$).

After the parameter estimation, the troposphere correction information which was originally given only for the reference stations is available area-wide for the region of interest (e.g., a cap), since the estimated ASHA coefficients can be used in equation (7) to compute the troposphere correction parameter for any location inside the region of interest (e.g., the cap).

It is a feature of a properly configured parameter estimation that the estimated parameters are over-determined (i.e. the number of observations is greater than the number of parameters to be estimated). Thus, for every observation, a residual defined by equation (11) is available after the estimation of the ASHA coefficients.

$$res_{ASHA} = \text{Tropo Parameter} - \sum_{n=0}^{N_{max}} \sum_{m=0}^{n} [(C_{n,m} \cdot \cos(m\lambda_{ASHA}) + S_{n,m} \cdot \sin(m\lambda_{ASHA})) \cdot P_{n,m(\varphi_{ASHA})}] \quad (11)$$

2a. Adding Pseudo-Observations

Figure 6:
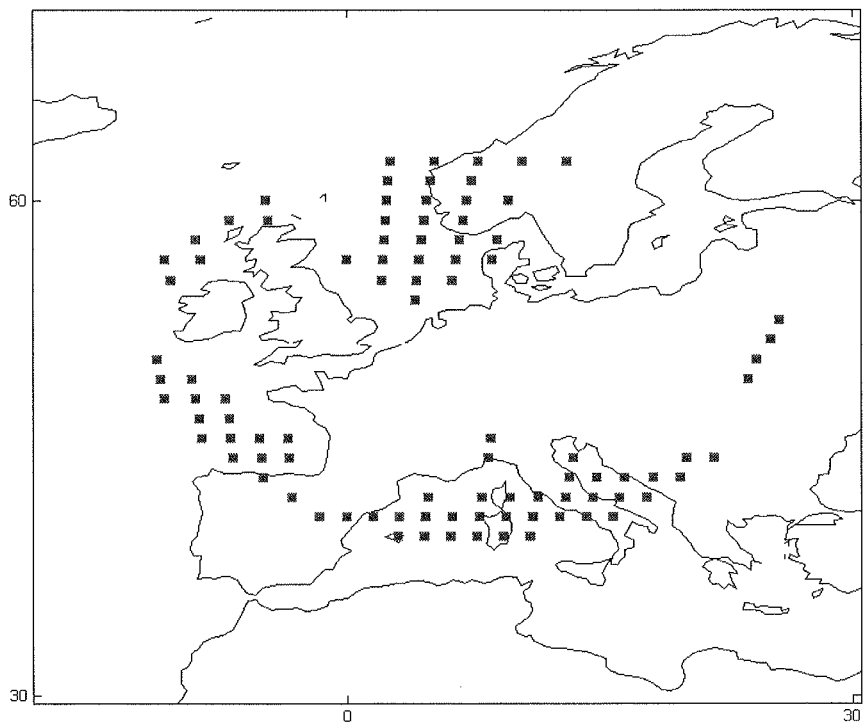
FIG. 6 schematically shows the locations corresponding to a plurality of pseudo-observations, in one exemplary embodiment.
Figure 7:
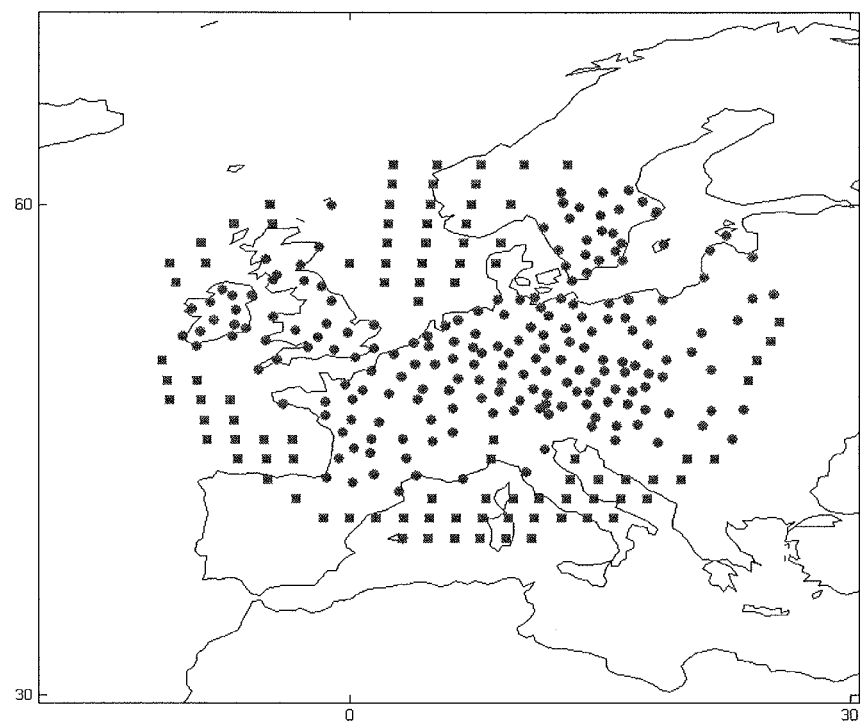
FIG. 7 schematically shows, using black dots, the location of some reference stations, and, using black squares, some locations corresponding to a plurality of pseudo-observations, in one exemplary embodiment.

Typically, the distribution of observations inside the region of interest, e.g. a cap, is not homogeneous since the distribution of reference stations is typically not homogeneous inside the region of interest, such as e.g. the cap. In that respect, FIG. schematically shows, using black dots, the location of a plurality of the reference stations in Central Europe, in one exemplary embodiment. It can be seen from FIG. 5 that vast areas are not covered by any reference station, mainly due to the seas. To prevent the estimated ASHA coefficients from showing undesirable artefacts (i.e., large extrapolation errors in the unobserved regions) for this reason, pseudo-observations are used in a grid only for the unobserved regions. In that respect, FIG. 6 schematically shows, using black squares, the locations corresponding to a plurality of pseudo-observations, in one exemplary embodiment. The pseudo-observations cover "unobserved regions". As expected, the pseudo-observations are needed mainly in the marine areas. The pseudo-observations provided at the grid points may simply be, in one embodiment, a distance-weighted mean value of the available, real observations. Afterwards, the whole region of interest, such as e.g. the whole cap, is covered by real observations and pseudo-observations so that, as a result, the estimation of the ASHA coefficients is very stable, i.e. the ASHA coefficients can be estimated stably. FIG. 7 schematically shows, using black dots, the location of reference stations, and, using black squares, the locations corresponding to a plurality of pseudo-observations, in one exemplary embodiment. In other words, FIG. 7 combines the information from FIGS. 5 and 6.

3. Accuracy Indicator for the Tropospheric Scaling Factors

European patent application EP 2 746 811 A1 (hereinafter referred to as "reference [12]"), describes an approach to derive accuracy information for a global ionosphere correction model based on GNSS parameter estimation residuals; i.e. the residuals are obtained from the computation of the GNSS parameter estimation which was done to determine a global ionosphere correction model. Within reference [12], the usage of a global SLM based on spherical harmonics is suggested to process the residuals of all satellites together in one common function, covering the whole globe. This function describes the accuracy of the global ionosphere correction model estimated beforehand.

In reference [5], this method was used successfully to describe accuracy information also for regional ionosphere correction models which are defined inside a spherical cap. Actually, the method described in reference [12] and adapted to spherical caps in reference [5] is not necessarily restricted to ionosphere correction models. It may also be applied to any scalar quantity given on a sphere or within a spherical cap.

Thus, the residuals $res_{ASHA}$ of equation (11) are used in an approach similar to the one described in reference [5] to derive a 1-sigma accuracy information for a troposphere correction model in terms of ZPD or tropospheric scaling factors.

The final result of this application of an accuracy indicator according to references [12] and [5] is a second set of ASHA coefficients to describe the accuracy of the troposphere correction model inside the specified spherical cap.

Additionally, the accuracy indicator may also be used to make the decision whether the regional troposphere correction model is used at all. Especially in the areas without real observations, the accuracy indicator may be indicating a rather bad accuracy. From equation (11), the root mean square (RMS) of residuals can be directly computed. If the accuracy indicator provides a standard deviation which is, e.g., four times greater than the RMS, the regional troposphere correction model is rejected. A threshold between 2.6 and 4.9 might be chosen since, for normally distributed data, the values obtained by multiplying the standard deviation or the RMS respectively by those numbers lead to an accuracy indicator threshold which provides a probability of error of 1% (factor 2.6) and 0.0001% (factor 4.9) respectively, if an accuracy indicator greater than the threshold is rejected. The described relations are for example explained in Gilbert Strang and Kai Borre, *LinearAlgebra, Geodesy, and GPS*, Wellesley-Cambridge Press, 1997 (ISBN 0-9614088-6-3), see chapter 9, "Random Variables and Covariance Matrices".

If the regional troposphere correction model is rejected due to the threshold check, the legacy approach may be used, i.e. the empirical a priori troposphere correction may be used instead of the regional troposphere correction model.

4. Data Transmission (i.e., a Possible Implementation of Step s50)

The ASHA representation covers the whole spherical cap. It is a very efficient method to transmit the delay and the accuracy information of the troposphere correction model to a user receiver. Quite large networks with a huge number of reference stations may require a relatively high ASHA resolution so that one set of coefficients may consist of about 50 to 100 coefficients. Message formats can be designed for this case so that the troposphere correction model can be transmitted within one message. This allows the messages to be interleaved with other PPP correction messages on low bandwidth links.

5. User Station Performance

For a NSS user station (i.e., a rover station), the ambiguity resolution and/or the position estimation are the main applications. In both cases, not only the ambiguities and/or the user station coordinates are initially unknown, but also the troposphere delay, see e.g. equations (4a), (4b) and (5). As already described in the section "Troposphere modelling in the context of PPP", the use of empirical a priori tropospheric models is typical for PPP applications. By using a troposphere model compiled and transmitted according to above steps 1 to 4, a troposphere delay is known which is much more accurate than the delay computed from empirical models. This very accurate troposphere delay is helpful to determine the other unknown parameters more quickly and more reliably. Especially the PPP convergence time for the height component, i.e. the time which is needed to get an accurate position estimate in the vertical component (e.g., an accuracy below 9 cm), is reduced by high-accuracy troposphere correction models.

Figure 9:
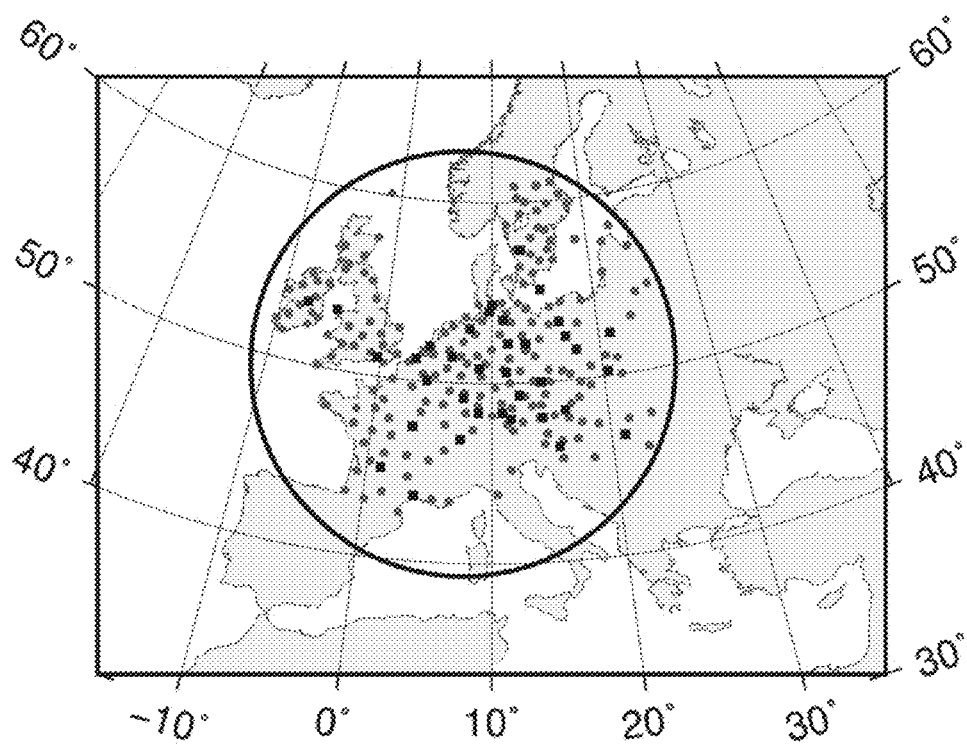
FIG. 9 schematically illustrates, in an experimental setup, reference stations (dark grey dots) and test stations (black squares) within a spherical cap (black circle)

For a network of reference stations located in Central Europe, one week of observation data was processed in an experimental setup. The regional network consisted of about 200 reference stations (see FIG. 9, wherein the reference stations are represented by dark grey dots). Their observations were used according the above-described method to generate regional tropospheric correction information (representing regional troposphere correction models). The spherical cap, used to specify the region of interest, was defined by a central point of 7 degrees longitude (East) and 51 degrees latitude (North) and a cap radius of 12 degrees. This cap is marked by a black circle in FIG. 9. The regional troposphere correction information and their accuracy indicating information were made available on 36 user receivers or test stations (see FIG. 9, wherein the test stations are marked by black squares) to improve the ambiguity determination and, by doing so, to speed up the convergence time. The convergence time is the time which is elapsed until the estimated position is converged to a predetermined reference position. The estimated position for a test station of the campaigns was considered to be converged when the horizontal offset to the reference position is less than 1.5 inch (i.e., about 4 cm). The threshold for the vertical offset is 3.5 inch (i.e., about 9 cm). To investigate this convergence time, the receiver of the test stations were restarted every 20 minutes, i.e. the ambiguity determination and the position estimation started from scratch every 20 minutes. Finally, there were around 18000 convergence runs (one every 20 minutes) available for statistical evaluation.

Besides the above-described test setup (regional troposphere correction information available), a second test was done. That one was in general identical to the first one but the troposphere corrections for the test stations were computed from an empirical a priori troposphere model. This test provided the statistical benchmark for the legacy solution. The legacy solution is based on precise satellite information contain precise orbit, clocks, and biases as well as a regional ionosphere model.

Figure 10:
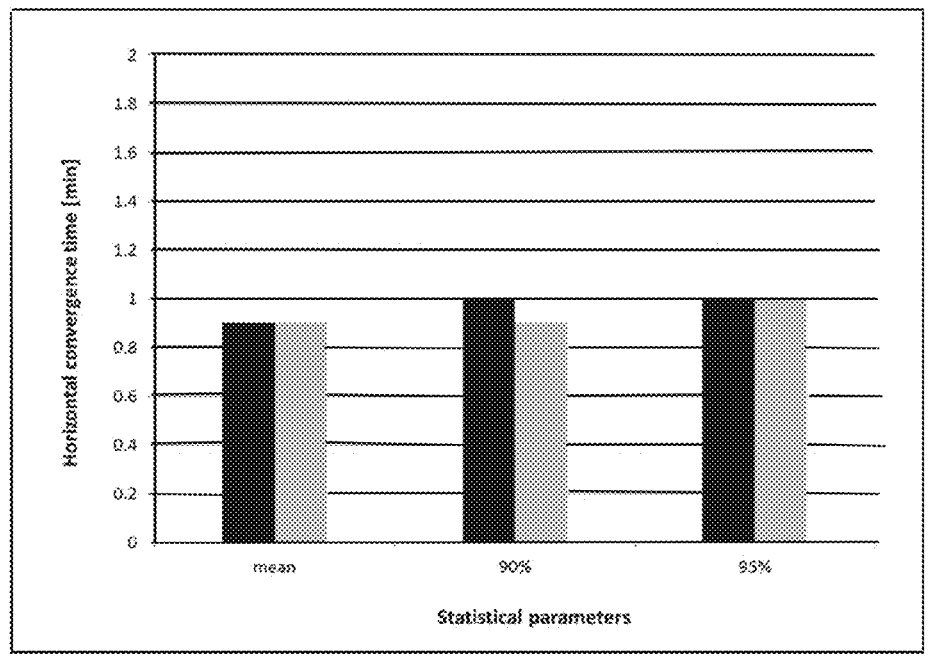
FIG. 10 illustrates, in an experimental setup, the comparison of the horizontal convergence times of test stations in Central Europe with (grey bars) and without (black bars) regional troposphere correction information.
Figure 11:
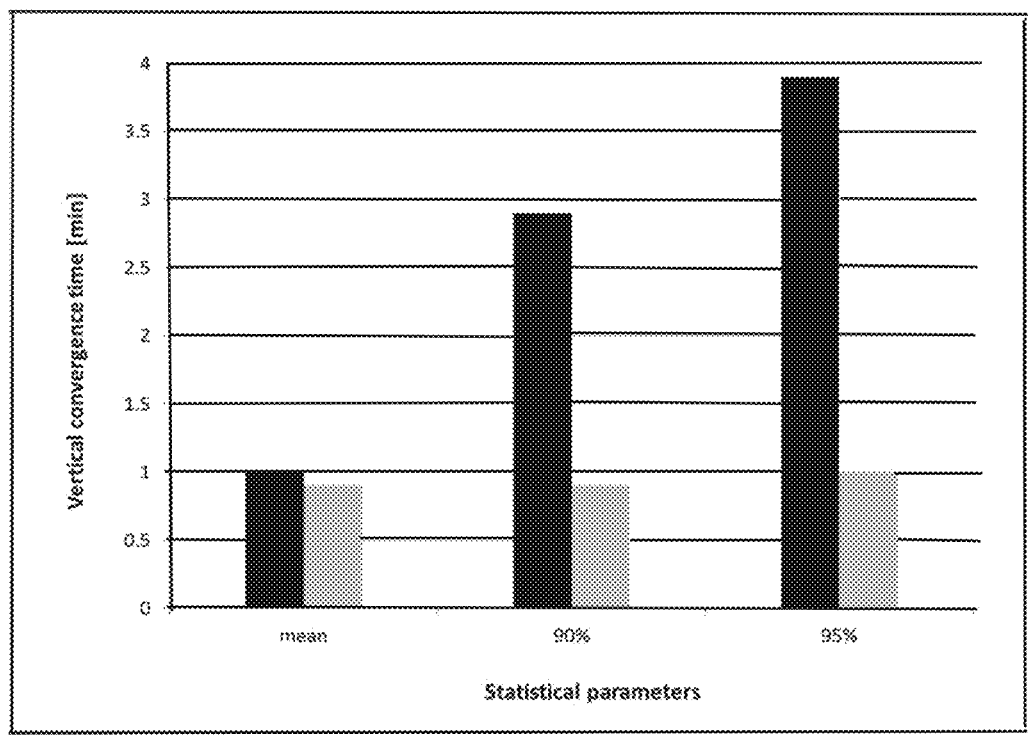
FIG. 11 illustrates, in an experimental setup, the comparison of the vertical convergence times of test stations in Central Europe with (grey bars) and without (black bars) regional tropospheric correction information.

FIGS. 10 and 11 show the results of the statistical evaluation of the convergence times of the above-mentioned test stations in both above-mentioned experimental setups both for the horizontal convergence (FIG. 10) and the vertical convergence (FIG. 11). The results of setup 1 (regional troposphere correction information available) are shown by grey bars on the right-hand side of each of the three couples of bars, whereas the results of setup 2 (only empirical troposphere correction available) are shown by black bars on the left-hand side of each of the three couples of bars. The result shown by FIGS. 10 and 11 are based on convergence tests simulating already a delay for the message transmission and decoding, so that the shortest convergence time cannot be smaller than 0.7 minutes. By introducing the regional troposphere correction information, the horizontal convergence time was improved only slightly (there is a small improvement in the 90% percentile, but no apparent improvement in the average horizontal convergence time and in the 95% percentile). The result is similar for the average vertical convergence time: it slightly improves from 1.0 to 0.9 minutes. In the two percentile scenarios, the improvement for the vertical convergence time becomes significant. For example, the 95% percentile shows that, by applying regional troposphere correction information, the convergence time is 1 minute in 95% of the test runs (grey bar). The corresponding convergence time is 3.9 minutes by applying legacy correction information only (black bar), i.e. the improvement for the 95% percentile is about 3 minutes or 75% respectively.

The described results confirm the expected improvement via experiment using real data exemplarily: The vertical convergence times are reduced significantly by applying regional troposphere correction information.

Apparatus

Figure 12:
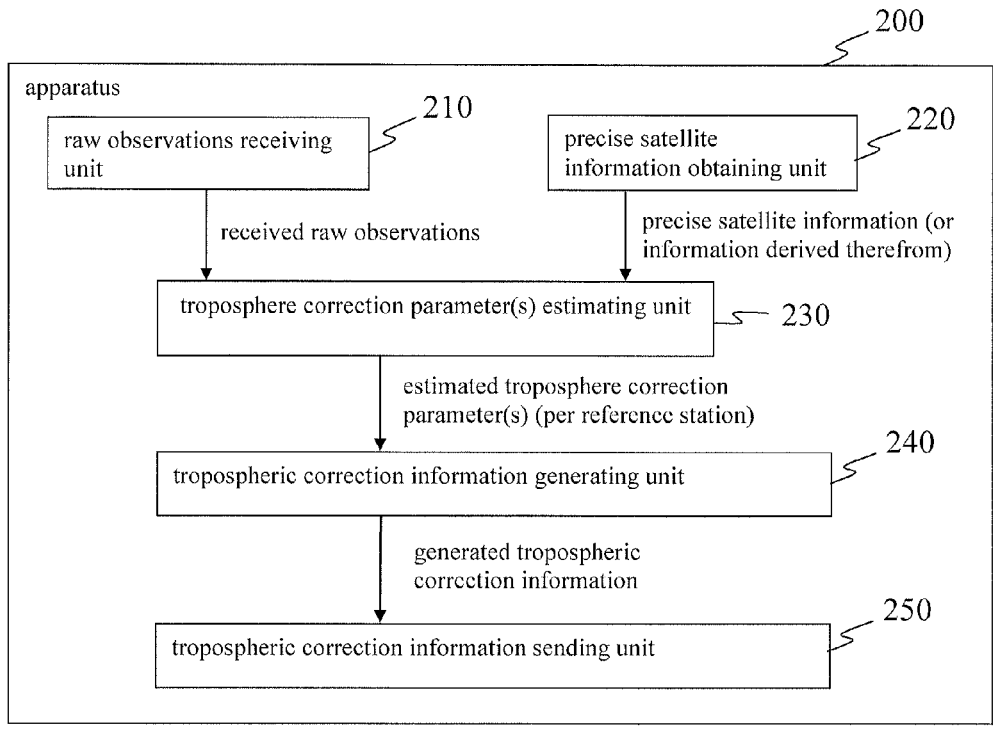
FIG. 12 schematically illustrates an apparatus, in one embodiment, for generating regional tropospheric correction information, and for sending said correction information.

In one embodiment, schematically illustrated by FIG. 12, an apparatus 200 is provided for generating regional tropospheric correction information to be used by, or for the benefit of, at least one NSS receiver. The NSS receiver(s) may be located, at one point in time, in a region of interest of the Earth's surface.

Apparatus 200 comprises a first unit, herein referred to as "raw observations receiving unit" 210, a second unit, herein referred to as "precise satellite information obtaining unit" 220, a third unit, herein referred to as "troposphere correction parameter(s) estimating unit" 230, a fourth unit, herein referred to as "tropospheric correction information generating unit" 240, and a fifth unit, herein referred to as "tropospheric correction information sending unit" 250.

Raw observations receiving unit 210 is configured for, for each of a plurality of reference stations in the region of interest, receiving raw observations (here hereinafter referred to as "multiple-frequency-signals-based raw observations") obtained by the reference station observing NSS multiple-frequency signals from a plurality of NSS satellites over multiple epochs.

Precise satellite information obtaining unit 220 is configured for obtaining information (herein referred to as "precise satellite information"), on: a) the orbit position of each one of the plurality of NSS satellites, and b) a clock offset of each one of the plurality of NSS satellites; or is configured for obtaining information derived from the precise satellite information.

Troposphere correction parameter(s) estimating unit 230 is configured for, for each of the plurality of reference stations, estimating at least one troposphere correction parameter by evaluating NSS observation equations using i) the precise satellite information or the information derived from the precise satellite information, and ii) the received multiple-frequency-signals-based raw observations or a linear combination thereof.

Tropospheric correction information generating unit 240 is configured for generating the tropospheric correction information, based on the estimated at least one troposphere correction parameter per reference station. The tropospheric correction information comprises: at least one mathematical function (each of which being here referred to as "regional tropospheric delay function"), and its coefficients (here referred to as "regional tropospheric delay coefficients"). The regional tropospheric delay function(s) and its regional tropospheric delay coefficients representing a delay (here referred to as "tropospheric delay") affecting a NSS signal passing through the troposphere in the region of interest.

Tropospheric correction information sending unit 250 is configured for sending the tropospheric correction information to the at least one NSS receiver or to one or more apparatus in charge of processing observations from NSS receiver(s).

In other embodiments, apparatus 200 may comprise further units, sub-units and/or functionalities as previously discussed. For example, apparatus 200 may be further configured to receive a regional ionosphere model as well.

Figure 13:
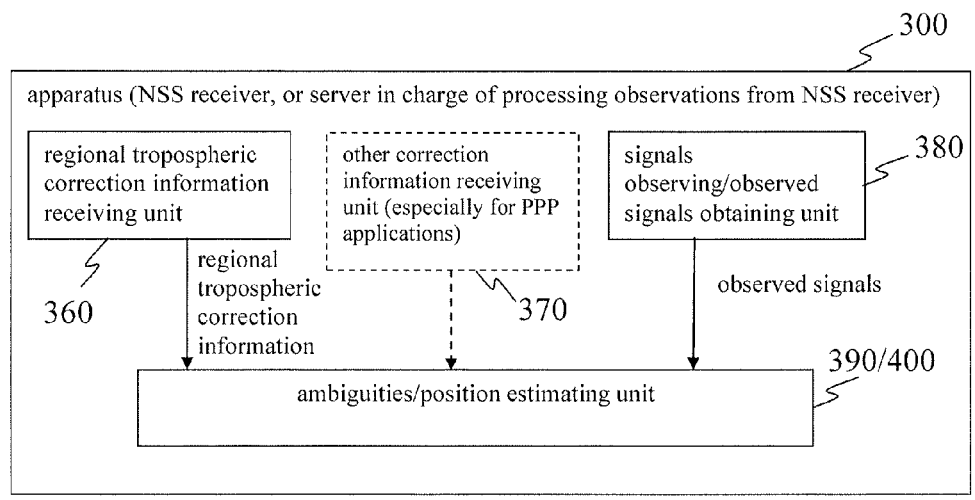
FIG. 13 schematically illustrates an apparatus making use of regional tropospheric correction information, in one embodiment.

In one embodiment, schematically illustrated by FIG. 13, an apparatus 300, i.e. a navigation satellite system (NSS) receiver or a server in charge of processing observations from the NSS receiver, is configured to make use of the regional tropospheric correction information. In particular, apparatus 300 comprises a first unit, herein referred to as "regional tropospheric correction information receiving unit" 360, a second unit, herein referred to as "signals observing/observed signals obtaining unit" 380, and a third unit, herein referred to as "ambiguities/position estimating unit" 390/400.

Regional correction information receiving unit 360 is configured for receiving (regional) tropospheric correction information, wherein said (regional) tropospheric correction information comprises: (i) at least one mathematical function ("regional tropospheric delay function") and (ii) its coefficients ("regional tropospheric delay coefficients"). As mentioned above, the regional tropospheric delay function(s) and its regional tropospheric delay coefficients represent a delay, i.e. a tropospheric delay, affecting a NSS signal passing through the troposphere in a region of interest of the Earth's surface.

Signals observing/observed signals obtaining unit 380 is configured for observing NSS multiple-frequency signals from the plurality of NSS satellites over multiple epochs, or is configured for obtaining such observed signals.

Ambiguities/position estimating unit 390/400 is configured for at least one of: (i) estimating ambiguities in the carrier phase of the observed signals using the received tropospheric correction information, and (ii) estimating the position of the NSS receiver using the observed signals and the received tropospheric correction information.

In other embodiments, apparatus 300 may comprise further units, sub-units and/or functionalities as previously discussed with reference notably to FIG. 4. For example, the so-called "other correction information receiving unit" 370 depicted in FIG. 13 may be provided for implementing step s170, as described above, which is particularly useful for PPP applications.

Additional Remarks

Any of the above-described methods and their embodiments may be implemented, at least partially, by means of a computer program. The computer program may be loaded on an apparatus, such as for example a NSS receiver (running on a rover station or a reference station) or a server (which may comprise one or a plurality of computers). Therefore, the invention also relates to a computer program, which, when carried out on an apparatus as described above, such as for example a NSS receiver (running on a rover station or a reference station) or a server, carries out any one of the above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

NSS receivers may include an antenna, configured to receive the signals at the frequencies broadcasted by the satellites, processor units, one or more accurate clocks (such as crystal oscillators), one or more central processing units (CPU), one or more memory units (RAM, ROM, flash memory, or the like), and a display for displaying position information to a user.

Where the terms "raw observations receiving unit", "precise satellite information obtaining unit", "troposphere correction parameter(s) estimating unit", "tropospheric correction information generating unit", "tropospheric correction information sending unit", "regional tropospheric correction information receiving unit", "signals observing/observed signals obtaining unit", "ambiguities/position estimating unit", and the like are used herein as units (or sub-units) of an apparatus (such as a NSS receiver), no restriction is made regarding how distributed the constituent parts of a unit (or sub-unit) may be. That is, the constituent parts of a unit (or sub-unit) may be distributed in different software or hardware components or devices for bringing about the intended function. Furthermore, the units may be gathered together for performing their functions by means of a combined, single unit (or sub-unit).

The above-mentioned units and sub-units may be implemented using hardware, software, a combination of hardware and software, pre-programmed ASICs (application-specific integrated circuit), etc. A unit may include a central processing unit (CPU), a storage unit, input/output (I/O) units, network connection devices, etc.

The invention also relates to the following embodiments numbered (i) to (xi):

(i). Apparatus of claim 14, wherein the at least one regional tropospheric delay function and its regional tropospheric delay coefficients represent either a tropospheric zenith path delay parameter, suitable to be mapped to the elevation of a satellite-receiver-link to compute the tropospheric delay, the satellite-receiver-link being the link between a NSS receiver and a satellite from which signals are received by the NSS receiver, or a tropospheric scaling factor, suitable to be applied to a delay determined by an empirical a priori troposphere model to compute the tropospheric delay.

(ii). Apparatus of embodiment (i), wherein the tropospheric zenith path delay parameter or the tropospheric scaling factor, whichever is represented by the at least one regional tropospheric delay function and its regional tropospheric delay coefficients, accounts for at least one of a hydrostatic tropospheric delay, a wet tropospheric delay, and a total tropospheric delay.

(iii). Apparatus according to any one of claim 14 and embodiments (i) to (ii), wherein the obtained precise satellite information further contains information on at least one of:

a set of biases associated with each one of the plurality of NSS satellites; and ionospheric correction information.

(iv). Apparatus according to any one of claim 14 and embodiments (i) to (iii), wherein estimating (s30), for each of the plurality of reference stations, the at least one troposphere correction parameter is further based on at least one of:

the known position coordinates of the reference station; and at least partially resolved integer ambiguities in the carrier phase of the received multiple-frequency-signals-based raw observations.

(v). Apparatus according to any one of claim 14 and embodiments (i) to (iv), wherein estimating (s30), for each of the plurality of reference stations, the at least one troposphere correction parameter is further based on an ionospheric-free phase linear combination of the received multiple-frequency-signals-based raw observations.

(vi). Apparatus according to any one of claim 14 and embodiments (i) to (v), wherein generating (s40) the tropospheric correction information further comprises:

determining a mathematical function, hereinafter referred to as "regional accuracy indicating function", and its coefficients, hereinafter referred to as "regional accuracy indicating coefficients", based on the residuals of the regional tropospheric delay coefficients determination, wherein the regional accuracy indicating function and its regional accuracy indicating coefficients represent the vertical accuracy of the tropospheric delay represented by the at least one regional tropospheric delay function and its regional tropospheric delay coefficients.

(vii). Apparatus according to any one of claim 14 and embodiments (i) to (vi), wherein each of the at least one regional tropospheric delay function is in the form of a spherical harmonics expansion.

(viii). Apparatus according to any one of claim 14 and embodiments (i) to (vii), wherein each of the at least one regional tropospheric delay function is obtained by an Adjusted Spherical Cap Harmonics Analysis technique.

(ix). Apparatus according to any one of claim 14 and embodiments (i) to (viii), wherein the region of interest is a spherical cap.

(x). Apparatus according to any one of claim 14 and embodiments (i) to (ix), wherein the size of the region of interest comprises less than half of the Earth's surface.

(xi). Apparatus of claim 15, wherein the aforementioned tropospheric correction information is hereinafter referred to as "regional tropospheric correction information";

the regional tropospheric correction information further comprises a mathematical function, hereinafter referred to as "regional accuracy indicating function", and its coefficients, hereinafter referred to as "regional accuracy indicating coefficients", wherein the regional accuracy indicating function and its regional accuracy indicating coefficients represent the vertical accuracy of the tropospheric delay represented by the at least one regional tropospheric delay function and its regional tropospheric delay coefficients; and at least one of estimating (s190) ambiguities in the carrier phase of the observed signals, and estimating (s200) the position of the NSS receiver using the observed signals, makes use of either the regional tropospheric correction information, or tropospheric correction information applicable to any region of the Earth's surface, depending on the vertical accuracy represented by the regional accuracy indicating function and its regional accuracy indicating coefficients.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Method, carried out by a computer or set of computers, for generating tropospheric correction information, wherein the tropospheric correction information comprises information for correcting observations useful for estimating at least one of phase ambiguities and a position of at least one global or regional navigation satellite system (NSS) receiver located within the troposphere and on or above a region of interest of the Earth's surface, the method comprising:
  for each of a plurality of reference stations in the region of interest, receiving multiple-frequency-signals-based raw observations obtained by the reference station from a plurality of NSS satellites over multiple epochs;
  for each of the plurality of reference stations, obtaining precise satellite information or information derived from the precise satellite information, wherein the precise satellite information including:
    an orbit position of each one of the plurality of NSS satellites; and
    a clock offset of each one of the plurality of NSS satellites;
  for each of the plurality of reference stations, estimating at least one troposphere correction parameter by evaluating NSS observation equations using:
    the precise satellite information or the information derived from the precise satellite information; and
    the received multiple-frequency-signals-based raw observations or a linear combination thereof;
  generating the tropospheric correction information based on the estimated troposphere correction parameter for each of the plurality of reference stations, wherein the tropospheric correction information comprises
    at least one regional tropospheric delay function expressed as an expansion of a plurality of spherical harmonics with a plurality of regional tropospheric delay coefficients, each one of the plurality of regional tropospheric delay coefficients corresponding to a respective one of the plurality of spherical harmonics;
    the at least one regional tropospheric delay function and the plurality of regional tropospheric delay coefficients representing a tropospheric delay affecting a NSS signal passing through the troposphere in the region of interest; and
  sending the generated tropospheric correction information.

2. Method of claim 1, wherein the at least one regional tropospheric delay function and the plurality of regional tropospheric delay coefficients represent either:
  a tropospheric zenith path delay parameter, suitable to be mapped to an elevation of a satellite-receiver-link to compute the tropospheric delay, the satellite-receiver-link being the link between a NSS receiver and a satellite from which signals are received by the NSS receiver, or
  a tropospheric scaling factor, suitable to be applied to a delay determined by an empirical a priori troposphere model to compute the tropospheric delay.

3. Method of claim 2, wherein the tropospheric zenith path delay parameter or the tropospheric scaling factor accounts for at least one of:
  a hydrostatic tropospheric delay,
  a wet tropospheric delay, and
  a total tropospheric delay.

4. Method according to claim 1, wherein the obtained precise satellite information further contains information on at least one of:
  a set of biases associated with each one of the plurality of NSS satellites; and
  ionospheric correction information.

5. Method according to claim 1, wherein the step of estimating, for each of the plurality of reference stations, the at least one troposphere correction parameter is further based on at least one of:
  known position coordinates of the reference station; and
  at least partially resolved integer ambiguities in the carrier phase of the received multiple-frequency-signals-based raw observations.

6. Method according to claim 1, wherein the step of estimating, for each of the plurality of reference stations, the at least one troposphere correction parameter is further based on an ionospheric-free phase linear combination of the received multiple-frequency-signals-based raw observations.

7. Method according to claim 1, wherein the step of generating the tropospheric correction information further comprises:
  determining a regional accuracy indicating function with a plurality of regional accuracy indicating coefficients based on residuals of the regional tropospheric delay coefficients, wherein the regional accuracy indicating function and the plurality of regional accuracy indicating coefficients represent a vertical accuracy of the tropospheric delay.

8. Method according to claim 1, wherein each of the plurality of spherical harmonics comprises a respective Legendre polynomial, and each of the plurality of regional tropospheric delay coefficients comprises a respective coefficient of a corresponding Legendre polynomial.

9. Method according to claim 1, wherein the at least one regional tropospheric delay function is obtained by an Adjusted Spherical Cap Harmonics Analysis technique.

10. Method according to claim 1, wherein the region of interest is a spherical cap.

11. Method according to claim 1, wherein the size of the region of interest comprises less than half of the Earth's surface.

12. Computer program comprising instructions configured, when executed on a computer, to carry out a method according to claim 1.

13. Method carried out by a global or regional navigation satellite system (NSS) receiver, or by an apparatus in charge of processing observations from a NSS receiver, the method comprising:
  receiving tropospheric correction information, wherein the tropospheric correction information comprises:
    at least one regional tropospheric delay function expressed as an expansion of a plurality of spherical harmonics with a plurality of regional tropospheric delay coefficients, each one of the plurality of regional tropospheric delay coefficients corresponding to a respective one of the plurality of spherical harmonics;

the at least one regional tropospheric delay function and the plurality of regional tropospheric delay coefficients representing a tropospheric delay affecting a NSS signal passing through the troposphere in a region of interest of the Earth's surface;

observing NSS multiple-frequency signals from a plurality of NSS satellites over multiple epochs, or obtaining the NSS multiple-frequency signals; and at least one of:

estimating ambiguities in a carrier phase of the observed NSS multiple-frequency signals using the received tropospheric correction information, and estimating a position of the NSS receiver using the observed NSS multiple-frequency signals and the received tropospheric correction information.

14. Method of claim 13, wherein:

the tropospheric correction information further comprises a regional accuracy indicating function and a plurality of regional accuracy indicating coefficients, wherein the regional accuracy indicating function and the plurality of regional accuracy indicating coefficients represent a vertical accuracy of the tropospheric delay.

15. Apparatus configured for generating tropospheric correction information, wherein the tropospheric correction information comprises information for correcting observations useful for estimating at least one of phase ambiguities and a position of at least one global or regional navigation satellite system (NSS) receiver within the troposphere and on or above a region of interest of the Earth's surface, the apparatus configured for:

for each of a plurality of reference stations in the region of interest, receiving multiple-frequency-signals-based raw observations obtained by the reference station from a plurality of NSS satellites over multiple epochs;

obtaining precise satellite information or information derived from the precise satellite information, the precise satellite information comprises:

an orbit position of each one of the plurality of NSS satellites, and a clock offset of each one of the plurality of NSS satellites, for each of the plurality of reference stations, estimating at least one troposphere correction parameter by evaluating NSS observation equations using:

the precise satellite information or the information derived from the precise satellite information, and the received multiple-frequency-signals-based raw observations or a linear combination thereof;

generating the tropospheric correction information based on the estimated at least one troposphere correction parameter per reference station, wherein the tropospheric correction information comprises:

at least one regional tropospheric delay function expressed as an expansion of a plurality of spherical harmonics with a plurality of regional tropospheric delay coefficients, each one of the plurality of regional tropospheric delay coefficients corresponding to a respective one of the plurality of spherical harmonics;

the at least one regional tropospheric delay function and the plurality of regional tropospheric delay coefficients representing a tropospheric delay affecting a NSS signal passing through the troposphere in the region of interest; and sending the generated tropospheric correction information.

16. Apparatus, being an NSS receiver or a server in charge of processing observations from a NSS receiver, the apparatus configured for:

receiving tropospheric correction information, wherein the tropospheric correction information comprises:

at least one regional tropospheric delay function expressed as an expansion of a plurality of spherical harmonics with a plurality of regional tropospheric delay coefficients, each one of the plurality of regional tropospheric delay coefficients corresponding to a respective one of the plurality of spherical harmonics;

the at least one regional tropospheric delay function and the plurality of regional tropospheric delay coefficients representing a tropospheric delay affecting a NSS signal passing through the troposphere in a region of interest of the Earth's surface;

observing NSS multiple-frequency signals from a plurality of NSS satellites over multiple epochs, or obtaining the NSS multiple-frequency signals; and at least one of:

estimating ambiguities in a carrier phase of the observed NSS multiple-frequency signals using the received tropospheric correction information, and estimating a position of the NSS receiver using the observed NSS multiple-frequency signals and the received tropospheric correction information.

* * * * *